(12) United States Patent
Yamazaki

(10) Patent No.: US 6,275,261 B1
(45) Date of Patent: Aug. 14, 2001

(54) METHOD AND APPARATUS FOR OPERATING AN IMAGE SENSING DEVICE

(75) Inventor: Yasuyuki Yamazaki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/870,776

(22) Filed: Jun. 6, 1997

(30) Foreign Application Priority Data

Jun. 12, 1996 (JP) .................................................... 8-150955

(51) Int. Cl.[7] .......................................................... H04N 3/14
(52) U.S. Cl. ............................................................... 348/273
(58) Field of Search .................................... 348/273, 279, 348/282, 220, 230, 231, 311, 312, 320, 322

(56) References Cited

U.S. PATENT DOCUMENTS

| | | | |
|---|---|---|---|
| 5,229,857 | * 7/1993 | Taniji | 348/312 |
| 5,579,047 | * 11/1996 | Yamagani | 348/282 |
| 5,847,758 | * 12/1998 | Izuka | 348/321 |
| 5,956,086 | * 9/1999 | Sawanobori | 348/273 |

FOREIGN PATENT DOCUMENTS

| | | | |
|---|---|---|---|
| 0512 826 A2 | 11/1992 | (EP) | H04N/5/91 |
| 0505 117 A2 | 8/1993 | (EP) | H04N/3/15 |
| 0630 151 A2 | 12/1994 | (EP) | H04N/3/15 |
| 0660 617 A2 | 6/1995 | (EP) | H04N/9/04 |
| 0689 346 A1 | 12/1995 | (EP) | H04N/3/15 |
| 0689346A1 | * 12/1995 | (EP) | H04N/3/15 |
| 0757 496 A2 | 2/1997 | (EP) | H04N/9/04 |

OTHER PUBLICATIONS

European Search Report, Oct. 16, 1997.

* cited by examiner

*Primary Examiner*—Wendy R. Garber
*Assistant Examiner*—Alicia M. Harrington
(74) *Attorney, Agent, or Firm*—Morgan & Finnegan, LLP

(57) ABSTRACT

A method and apparatus for operating an image sensing device that performs photoelectric conversion and stores the converted charges so that the apparatus obtains a smooth moving image. The pixels of the image sensing device are arranged in two dimensions and, preferably, covered with a complementary color filter of magenta, green, cyan, and yellow. Different combinations of two of these four colors alternate on the even and odd rows of pixels in such a manner that the filter is arranged in a check pattern. The operation of the image sensing device uses eight operation signals and a two-step process that is performed repetitively to obtain one image frame. The first step in the process adds the image signals associated with two adjoining rows in the vertical direction, skips a predetermined number of rows of pixels, and outputs the resultant image signals. The second step in the process adds the image signals associated with two adjoining rows in the oblique direction, skips a predetermined number of rows of pixels, and outputs the resultant image signals. When the image sensing device completes the processing of the frame, the same two-step process is applied to the skipped rows of pixels. The image sensing device generates color image signals by using the resultant image signals output from the application of the two-step process on the skipped rows of pixels.

21 Claims, 18 Drawing Sheets

FIG. 2

|  | m−5 | m−4 | m−3 | m−2 | m−1 | m |  |
|---|---|---|---|---|---|---|---|---|
| Cy | Ye | Cy | Ye | Cy | Ye | Cy | Ye |  |
| G | Mg | G | Mg | G | Mg | G | Mg |  |
| Cy | Ye | Cy | Ye | Cy | Ye | Cy | Ye | n−5 |
| Mg | G | Mg | G | Mg | G | Mg | G | n−4 |
| Cy | Ye | Cy | Ye | Cy | Ye | Cy | Ye | n−3 |
| G | Mg | G | Mg | G | Mg | G | Mg | n−2 |
| Cy | Ye | Cy | Ye | Cy | Ye | Cy | Ye | n−1 |
| Mg | G | Mg | G | Mg | G | Mg | G | n |

| ▯▯▯▯▯ CHARGE IN n-TH ROW | ADD | ▦▦▦▦ SUM OF CHARGES IN n-TH ROW AND (n–1)-TH ROW |
| ▭▭▭▭ CHARGE IN (n–1)-TH ROW | | |

| ⧹⧹⧹⧹ CHARGE IN (n–2)-TH ROW | → | ⊠⊠⊠⊠ SUM OF CHARGES IN (n–2)-TH ROW AND (n–3)-TH ROW |
| ⫽⫽⫽⫽ CHARGE IN (n–3)-TH ROW | | |

▢ SUM OF CHARGES IN (n–4)-TH ROW AND (n–5)-TH ROW

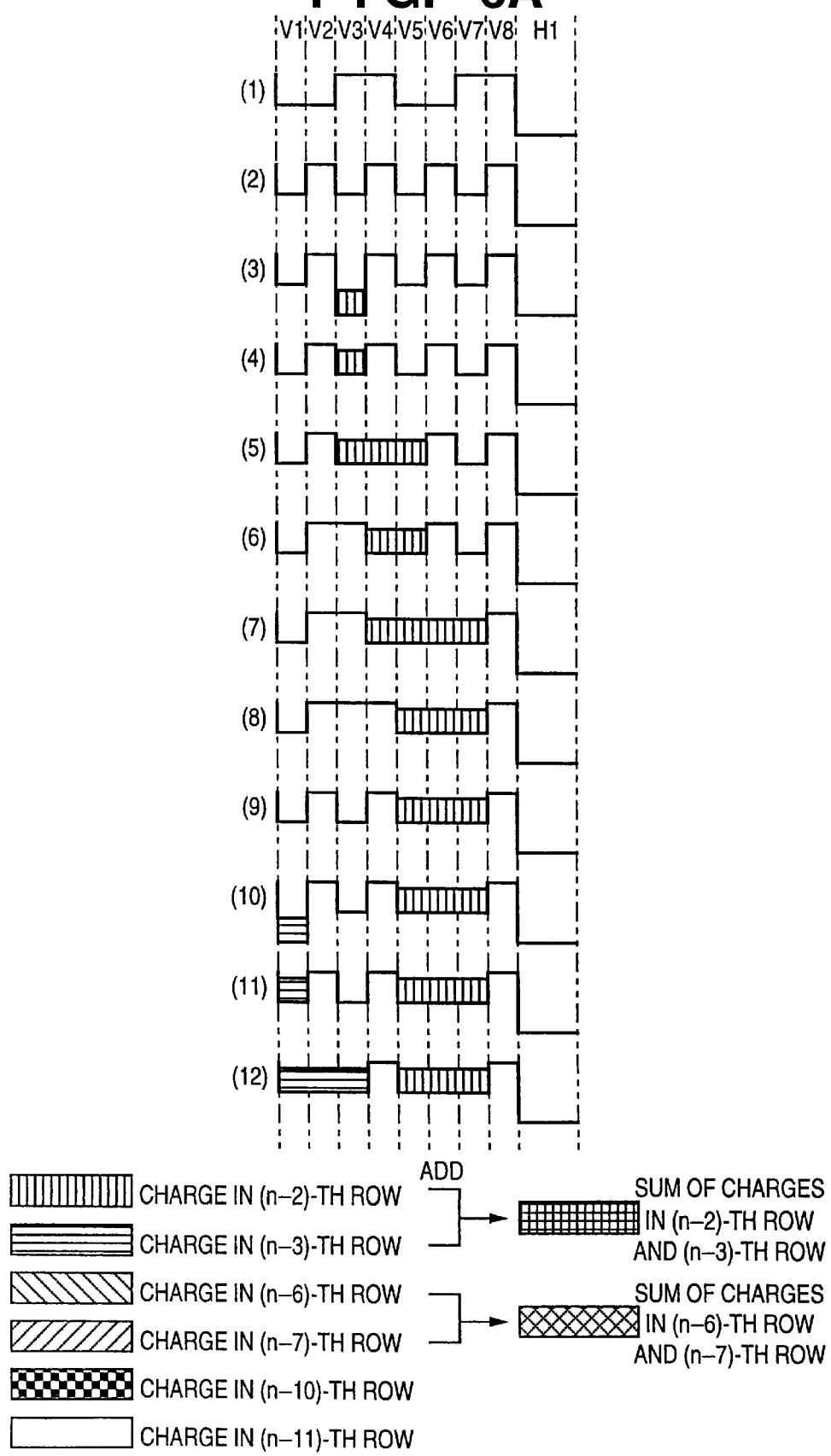

FIG. 8

|     | m-5 | m-4 | m-3 | m-2 | m-1 | m  |    |    |
|-----|-----|-----|-----|-----|-----|-----|-----|-----|
| Cy | Ye | Cy | Ye | Cy | Ye | Cy | Ye |    |
| Mg | G  | Mg | G  | Mg | G  | Mg | G  |    |
| Ye | Cy | Ye | Cy | Ye | Cy | Ye | Cy | n-5 |
| G  | Mg | G  | Mg | G  | Mg | G  | Mg | n-4 |
| Cy | Ye | Cy | Ye | Cy | Ye | Cy | Ye | n-3 |
| Mg | G  | Mg | G  | Mg | G  | Mg | G  | n-2 |
| Ye | Cy | Ye | Cy | Ye | Cy | Ye | Cy | n-1 |
| G  | Mg | G  | Mg | G  | Mg | G  | Mg | n   |

METHOD AND APPARATUS FOR OPERATING AN IMAGE SENSING DEVICE

BACKGROUND OF THE INVENTION

The present invention relates to a method for operating an image sensing device and an image sensing apparatus adopting the method and, more particularly, to an operation method for driving an image sensing device comprising a plurality of pixels arranged in two dimension, and an image sensing apparatus having the image sensing device and an image sensing method which adopt the operation method.

FIG. 12 shows a brief configuration of a conventional interline-type solid-state image sensing device. In FIG. 12, reference numeral 101 denotes pixels, each including a photoelectric converter, for storing charges; 102p, vertical transfer charge-coupled devices (VCCDs), each including a plurality of CCDs operated by four different operation pulses, which are provided along vertical lines (i.e., columns) of the pixels 101; and 103p, a horizontal transfer CCD (HCCD), electrically connected to the VCCDs 102p, having a plurality of CCDs operated by two different operation pulses. The VCCDs 102p and the HCCD 103p are shielded from light. Further, reference numeral 104 denotes a charge detector; 105, an output terminal for outputting signals; and 106p, 107p, 108p and 109p, input terminals of the operation pulses to the VCCDs 102p, and respective operation pulses are supplied to the VCCDs 102p. Reference numerals 114p and 115p denote input terminals of operation pulses to the HCCD 103p, and respective operation pulses are provided to the HCCD 103p.

Next, an operation of the image sensing device having the above configuration is explained.

Charges obtained by photoelectric conversion and stored in the pixels 101 are transferred to the VCCDs 102p, and sequentially transferred toward the HCCD 103p in accordance with the four operation pulses $\phi V1p$, $\phi V2p$, $\phi V3p$ and $\phi V4P$. The HCCD 103p transfers charges of one horizontal line (i.e., row) transferred from the VCCDs 102p to the charge detector 104 in accordance with the two operation pulses $\phi H1p$ and $\phi H2p$. The transferred charges are converted into voltage signals by the charge detector 104, then outputted from the output terminal 105.

Further, the image signals outputted from the image sensing device are transformed into signals of a predetermined format by applying predetermined signal processes in not-shown circuits, then recorded on a variety of recording media, displayed on a display device, or outputted to outside.

With the advance of technology, the number of pixels used in an image sensing device has increased, and now it is not a rare case that the number of pixels used in an image sensing device is greater than the number of pixels used in an output device. The above situation often happens when displaying a sensed image on a liquid crystal display (LCD), for example, since the number of pixels used in an LCD is much lower than that of an image sensing device in many cases (e.g., about 240 rows). When outputting an image sensed by a conventional image sensing device to such an output device, signals of all the pixels of the image sensing device have to be read out, stored in a recording medium, such as a memory, then thinned down to the necessary number of rows of signals for the output device, and outputted. Therefore, a memory and a processing circuit for thinning signals are necessary, which increases complexities of circuits as well as manufacturing cost.

Furthermore, as the number of pixels used in the image sensing device increases, it takes longer to read signals of all the pixels. As a result, the number of images obtained in one second decreases, thereby a smooth moving image can not be obtained. The above problem can be solved by operating the image sensing device at higher speed, however, it becomes necessary to improve performance of semiconductor in that case, which also causes an increase in manufacturing cost.

SUMMARY OF THE INVENTION

The present invention has been made in consideration of the above situation, and has as its object to provide an operation method for operating an image sensing device in which, while skipping a predetermined number of rows, image signals, which can be used for generating image signals, are read out from the image sensing device, and an image sensing apparatus, having the image sensing device, adopting the operation method.

According to the present invention, the foregoing first object is attained by providing a method for operating an image sensing device which performs photoelectric conversion and stores converted charges having a plurality of pixels, arranged in two dimensions, the method comprising: a first reading step of adding image signals of two adjoining rows while skipping a predetermined number of rows and outputting the resultant image signals; and a second reading step of adding image signals of two adjoining rows out of the rows skipped at the first reading step while skipping the predetermined number of rows and outputting the resultant image signals.

Preferably, at the first and second reading steps, a reading step of adding signals stored in pairs of adjoining pixels in the vertical direction in two rows and outputting the resultant signals and a reading step of adding signals stored in pairs of adjoining pixels in the oblique direction in two rows and outputting the resultant signals are alternatively performed at every predetermined plurality of rows until one frame is processed.

According to the present invention, the foregoing first object is also attained by providing an image sensing apparatus comprising: an image sensing device, having a plurality of pixels arranged in two dimension, for performing photoelectric conversion and storing converted charges; and control means for controlling the image sensing device with operation signals so as to add image signals of two adjoining rows while skipping a predetermined number of rows and output the resultant image signals, then add image signals of two adjoining rows out of the rows skipped previously while skipping the predetermined number of rows and output the resultant image signals.

Preferably the control means controls the operation signals so as to alternatively repeat 1) a process for adding signals stored in pairs of adjoining pixels in the vertical direction in two rows and outputting the resultant signals and 2) a process for adding signals stored in pairs of adjoining pixels in the oblique direction in two rows and outputting the resultant signals at every predetermined plurality of rows until one frame is processed.

Further, preferably the pixels of the image sensing device are covered with a complementary color filter of magenta, green, cyan, and yellow, arranged in such a manner that different combinations of two colors are used in even rows and odd rows and appear alternatively, and the two colors in either the even rows or odd rows are arranged in a check pattern, or with a complementary color filter of magenta, green, cyan, and yellow, arranged in such a manner that different combinations of two colors are used in even rows and odd rows and appear alternatively, and the two colors in the even rows and the two colors in odd rows are arranged in check patterns.

Accordingly, while skipping a predetermined number of rows, it is possible to read out signals from the image sensing device, and to form color image signals from the read image signals. Therefore, in a case where the number of pixels used in an output device is smaller than that used in the image sensing device, it is possible to omit the process of reading signals of all the pixels of the image sensing device, a process of storing the read signals in memory means, such as a memory, and a process of decreasing the number of rows of the signals into the number of rows necessary for the output device. Further, the memory or a processing circuit used for performing the above processes can be also omitted. Furthermore, by reading signals as skipping rows, time for reading image signals of an entire image is shortened.

It is the second object of the present invention to provide another operation method, which is used by switching between this operation method and above described operation method, capable of sensing a still image of better resolution having less color moiré, and an image sensing apparatus, having the image sensing device, adopting this operation method.

According to the present invention, the foregoing second object is attained by providing a method for operating an image sensing device which performs photoelectric conversion and stores converted charges having a plurality of pixels, arranged in two dimensions, the method comprising: a first reading step of separately reading image signals stored in adjoining two rows while skipping a predetermined number of rows; a second reading step of separately reading image signals stored in adjoining two rows out of the rows skipped at the first reading step; and a storage step of storing the image signals, read at the first and second reading steps, of all the pixels of an entire frame image.

According to the present invention, the foregoing second object is also attained by providing an image sensing apparatus comprising: an image sensing device which performs photoelectric conversion and stores converted charges having a plurality of pixels arranged in two dimensions; control means for controlling the image sensing device with operation signals so as to separately read image signals stored in adjoining two rows while skipping a predetermined number of rows then separately read image signals stored in adjoining two rows out of the plurality of rows skipped previously while skipping the predetermined number of rows; and storage means for storing the read image signals of all the pixels of an entire frame image.

Preferably, the pixels of the image sensing device are covered with a complementary color filter of magenta, green, cyan, and yellow, arranged in such a manner that different combinations of two colors are used in even rows and odd rows and appear alternatively, and the two colors in the even rows and the two colors in odd rows are arranged in check patterns.

With the operation method for independently reading signals of all the pixels of the image sensing device, it is possible to sense a still frame image of high resolution and having less color moiré.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing an arrangement of a color filter provided on the image sensing device according to a first embodiment of the present invention;

FIGS. 6A to 6C are timing charts for explaining transference of charges in the line-skip reading operation of the image sensing device according to the first and second embodiments of the present invention;

FIG. 8 is a view showing an arrangement of a color filter provided on the image sensing device according to the second embodiment of the present invention;

DETAILED DESCRIPTION OF THE PREFERRED EMBODIMENTS

Preferred embodiments of the present invention will be described in detail in accordance with the accompanying drawings.

Figure 1:
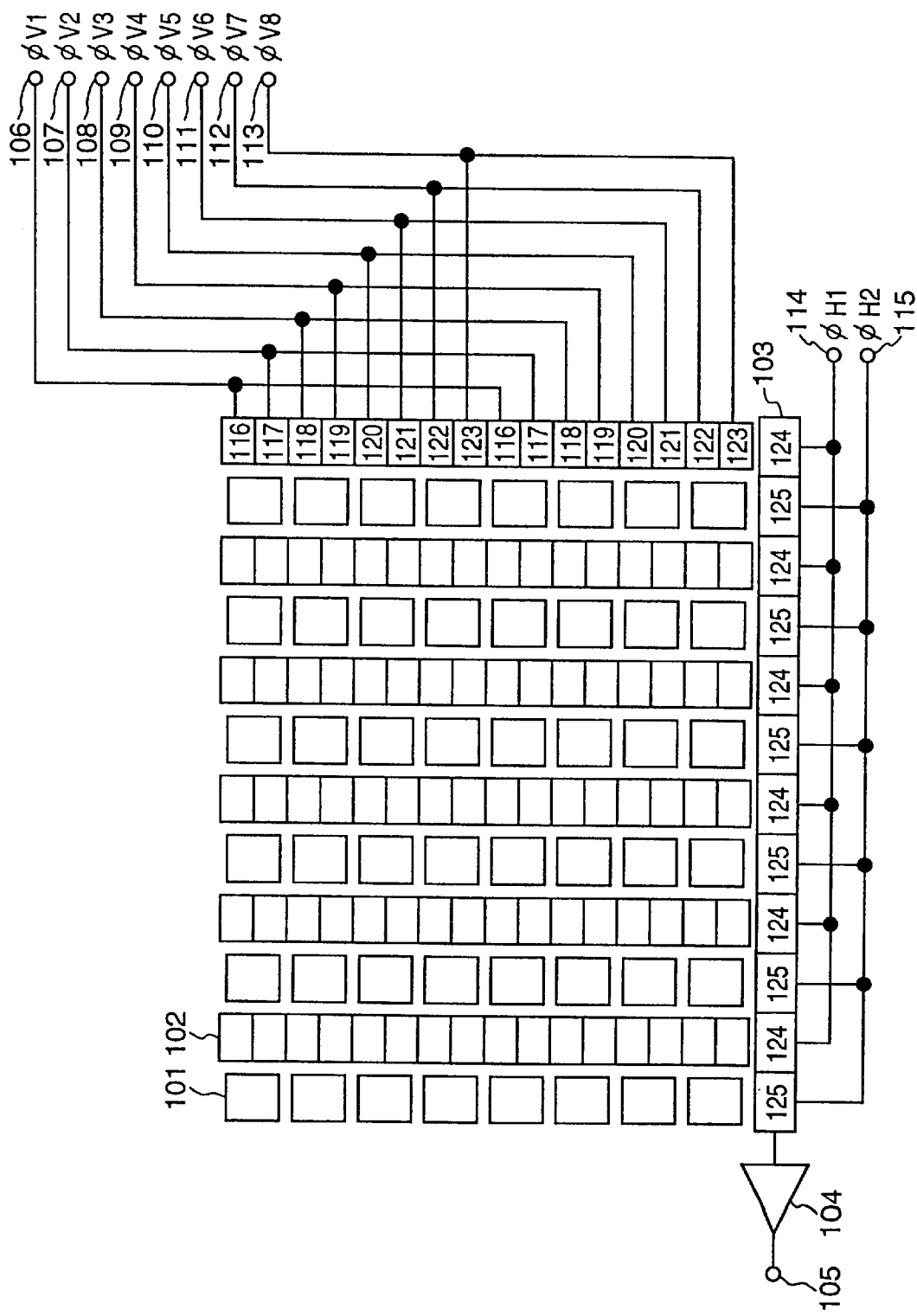
FIG. 1 is a view showing a configuration of an interline-type solid-state image sensing device used in an image sensing apparatus of the present invention.

FIG. 1 illustrates a brief configuration of an interline-type solid-state image sensing device (simply referred as "image sensing device", hereinafter) used in an image sensing apparatus according to the first embodiment of the present invention. In FIG. 1, reference numeral 101 denotes pixels, each including a photoelectric converter, for storing charges; 102, vertical transfer charge-coupled devices (VCCDs), each including a plurality of CCDs operated by eight different operation pulses which are controlled independently, which are provided along vertical lines (i.e., columns) of the pixels 101 (groups of CCDs operated by the respective eight operation pulses are referred by 116 to 123); 103, a horizontal transfer CCD (HCCD), electrically connected to the VCCDs 102, having a plurality of CCDs operated by two different operation pulses (groups of CCDs operated by the respective two operation pulses are referred by 124 and 125). The VCCDs 102 and the HCCD 103 are shielded from light. Further, reference numeral 104 denotes a charge detector; 105, an output terminal for outputting signals; and 106 to 113, input terminals of the operation pulses to the VCCDs 102, and respective operation pulses are supplied to the CCDs 116 to 123 of the VCCDs 102. Reference numerals 114 and 115 denote input terminals of operation pulses to the HCCD 103, and respective operation pulses are supplied to the CCD 124 and 125 of the HCCD 103.

Next, an operation of the image sensing device having the above configuration is explained.

Charges obtained by photoelectric conversion and stored in the pixels 101 are transferred to the VCCDs 102, and sequentially transferred toward the HCCD 103 in accordance with the eight operation pulses, $\phi V1$, $\phi V2$, $\phi\phi V3$, $\phi V4$, $\phi V5$, $\phi V6$, $\phi V7$, and $\phi V8$. The HCCD 103 transfers charges of one horizontal line (i.e., row) transferred from the VCCDs 102 to the charge detector 104 in accordance with the two operation pulses $\phi H1$ and $\phi H2$. The transferred charges are converted to voltage signals by the charge detector 104, then outputted from the output terminal 105. Details of the operation, including each operation pulse, will be described later.

FIG. 2 shows an arrangement of a color filter provided on the image sensing surface of the image sensing device used in the image sensing apparatus according to the first embodiment of the present invention.

Referring to FIG. 2, the color filter includes four color filter chips of cyan (Cy), yellow (Ye), green (G), and magenta (Mg), having different spectral characteristics. Different combinations of color filter chips of two colors are used in the even rows and in the odd rows (in FIG. 2, a combination of Cy and Ye and a combination of G and Mg). The color filter chips of two colors are alternatively arranged in the horizontal direction, and the filter chips in either the even or odd rows (G and Mg filters in FIG. 2) are shifted by one pixel in the horizontal direction in every even or odd row and form a check pattern. By arranging the filter chips in the aforesaid manner, filters of the same colors (Cy and Ye in FIG. 2) appear in every other pixel in each column, while filters of the other two colors (G and Mg in FIG. 2) alternatively appear in every other pixel in each column, between the filters of the same colors.

Next, as for operation methods for reading charges from the image sensing device covered with the color filter arranged in the aforesaid manner, a first operation method in which no horizontal line (row) is skipped (i.e., charges stored in all the pixels are read out) and a second operation method in which predetermined rows are skipped (i.e., unnecessary charges are abandoned by unit of row) are independently explained below in detail.

Figure 3:
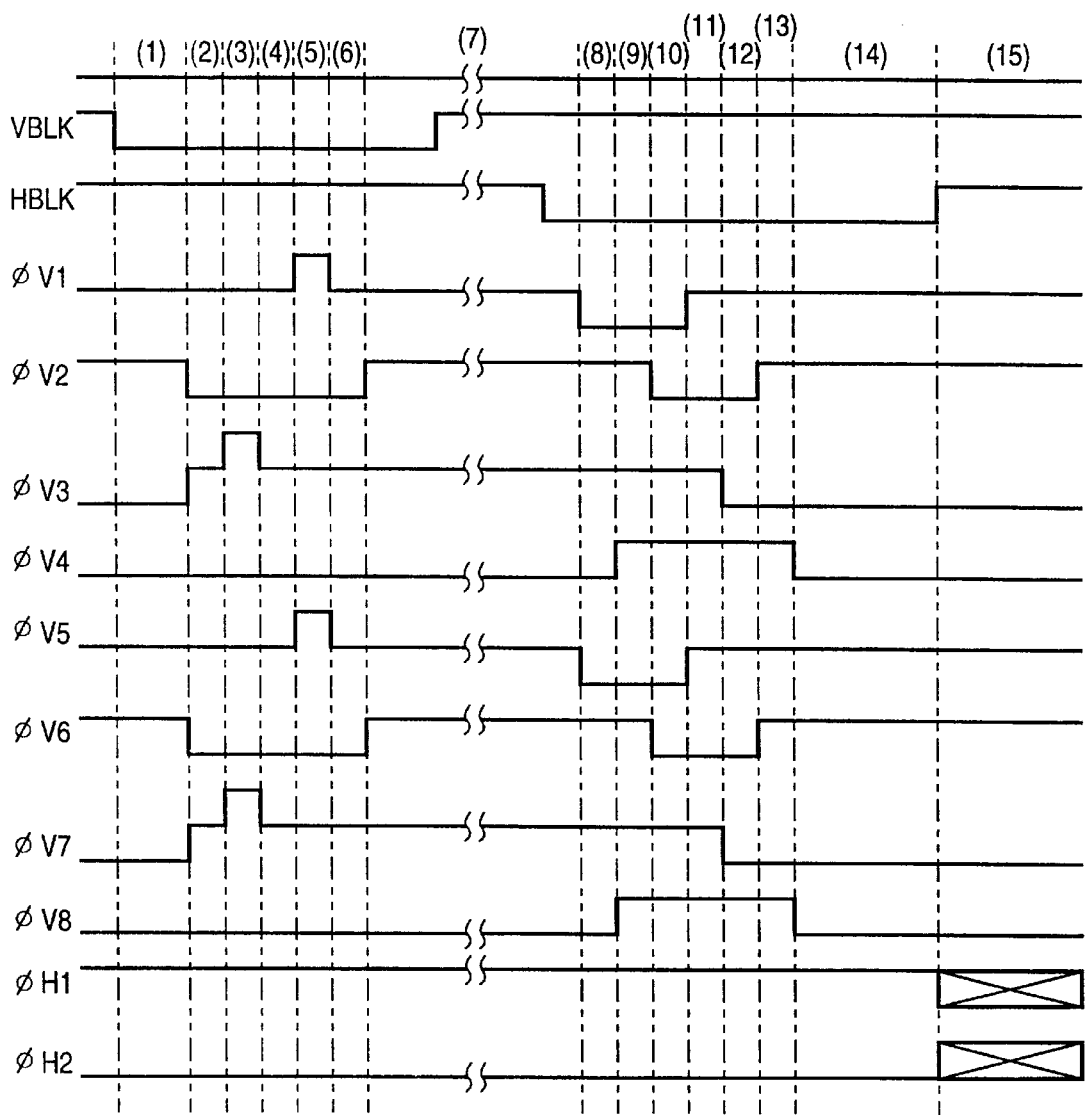
FIG. 3 is a timing chart of operation pulses used in a normal reading operation of the image sensing device according to the first embodiment of the present invention.

First, the first operation method, i.e., a normal reading operation in which no-row is skipped is explained. FIG. 3 shows operation pulses, used in the first operation method, to be provided to the image sensing device shown in FIG. 1. In FIG. 3, numbers in parentheses indicate time periods. Further, FIGS. 4A and 4B show a potential state of each CCD of the VCCDs 102 and the HCCD 103 and how the charges are transferred when the operation pulses shown in FIG. 3 are provided to the image sensing device.

Figure 4A:
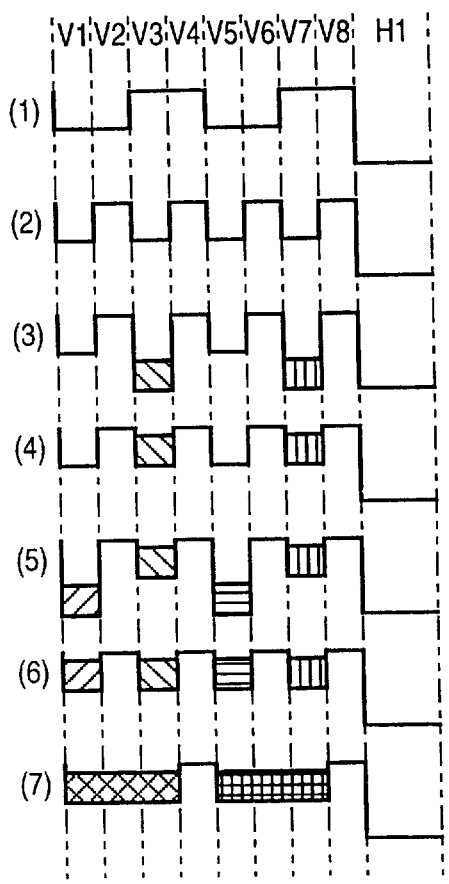
FIGS. 4A and 4B are timing charts for explaining transference of charges in the normal reading operation of the image sensing device according to the first embodiment of the present invention.
Figure 4B:
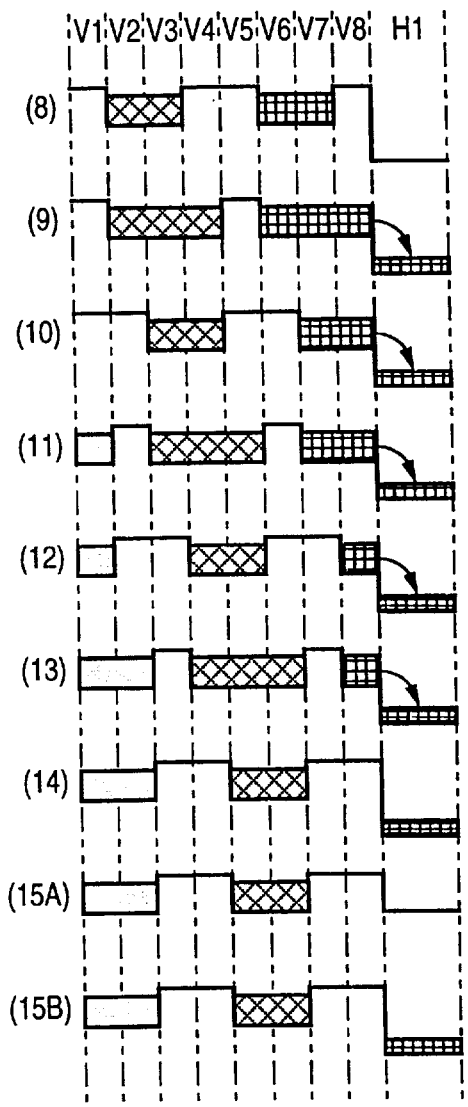

In FIGS. 4A and 4B, reference numerals V1 to V8 respectively denote voltage levels (here, depth of potential wells) of the CCDs 116 to 123 of the VCCDs 102, shown in FIG. 1, and reference numeral H1 denotes a voltage level (depth of potential well) of the CCDs 124 of the HCCD 103. Further, numbers in parentheses indicate time periods which correspond to those in FIG. 3. When an operation pulse is High, referring to FIG. 3, the potential well of the CCDs provided with the operation pulse becomes deep, whereas when an operation pulse is Low, the potential well of the CCDs provided with the operation pulse becomes shallow. It should be noted that the operation pulses, $\phi V1$, $\phi V3$, $\phi V5$ and $\phi V7$, have three voltage levels, and a voltage level which is higher than the voltage level "High" is used when charges are read from the pixels 101 to the VCCDs 102.

While the operation pulses as shown in FIG. 3 are provided to the image sensing device, when signal read pulses are provided in the vertical blanking period (VBLK), namely, when the potentials of the operation pulses $\phi V3$ and $\phi V7$ and the operation pulses $\phi V1$ and $\phi V5$ become the highest of the three potential levels in the period (3) and in the period (5), respectively, charges stored in the corresponding pixels 101 are read out to the adjoining VCCDs 102, since the potential wells of V3 and V7, and V1 and V5 of the VCCDs 102 become deep. Then in the period (7), the operation pulses as shown in FIG. 3 are provided to add the charges of the even rows and the charges of the odd rows before transferring the signal charges in the VCCDs 102 in the vertical direction.

Further, during a horizontal blanking period, namely, while the HBLK in FIG. 3 is low, in the periods (8) to (14), operation pulses as shown in FIG. 3 are provided, and the potential state of each CCD of the VCCDs 102 changes as shown in FIG. 4B. Accordingly, the charges in the VCCDs 102 are sequentially transferred in the vertical direction as seen from FIG. 4B, and the sums of the charges in the n-th row and the charges in the (n−1)-th row are transferred to the CCDs 124 (H1) of the HCCD 103.

Further, in the period (15) in FIG. 3, respective operation pulses having opposite polarities are alternatively provided as the operation pulses $\phi H1$ and $\phi H2$. In response to these operation pulses, the potential states in the periods (15A) and (15B) shown in FIG. 4B are alternatively repeated, thereby the charges in the VCCD 103 are transferred in the horizontal direction. Thereafter, the charges are converted into voltage signals by the charge detector 104 and sequentially outputted from the output terminal 105 to outside as time-sequential image signals.

By repeating the aforesaid processes, the charges stored in even rows and in their adjoining odd rows of the image sensing device are added, thereby the charges stored in all the pixels 101 are read out. In the next field period, the combination of rows whose charges are to be added is changed, namely, charges in the (n−1)-th row and the (n−2)-th row, and charges in the (n−3)-th row and the (n−4)-th row, and so on, are added, then read out.

Figure 5A:
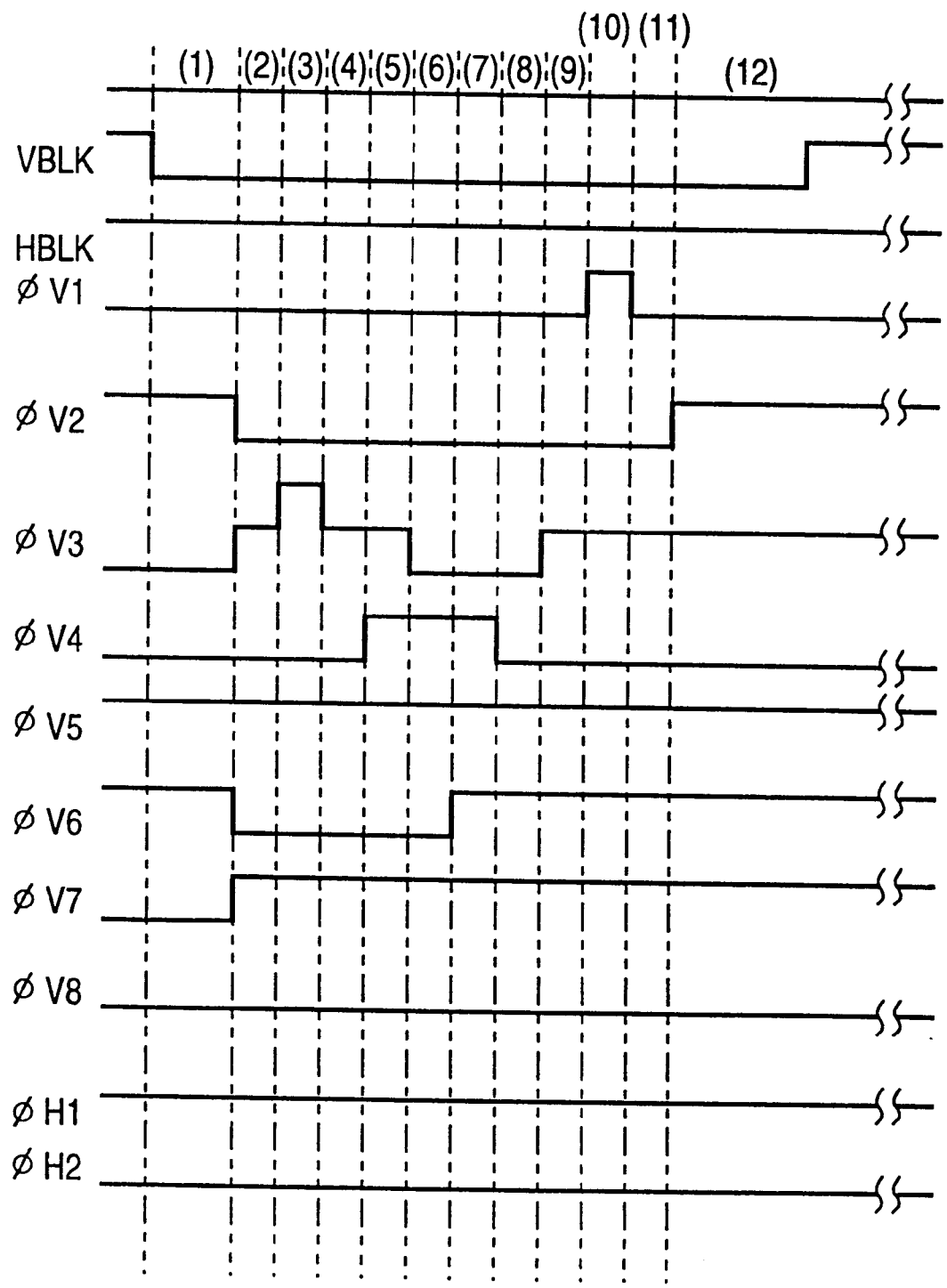
FIGS. 5A to 5C are timing charts of operation pulses used in a line-skip reading operation of the image sensing device according to the first and second embodiments of the present invention.
Figure 5B:
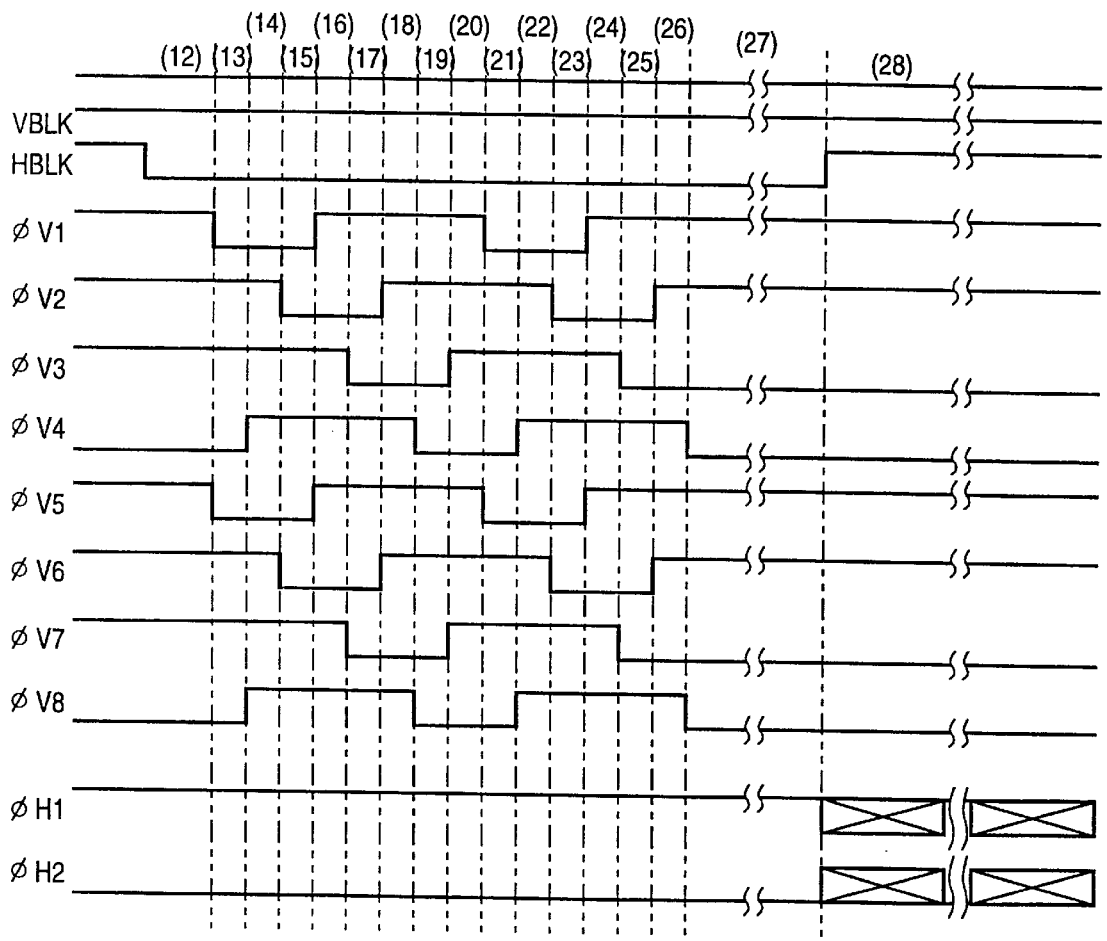
Figure 5C:
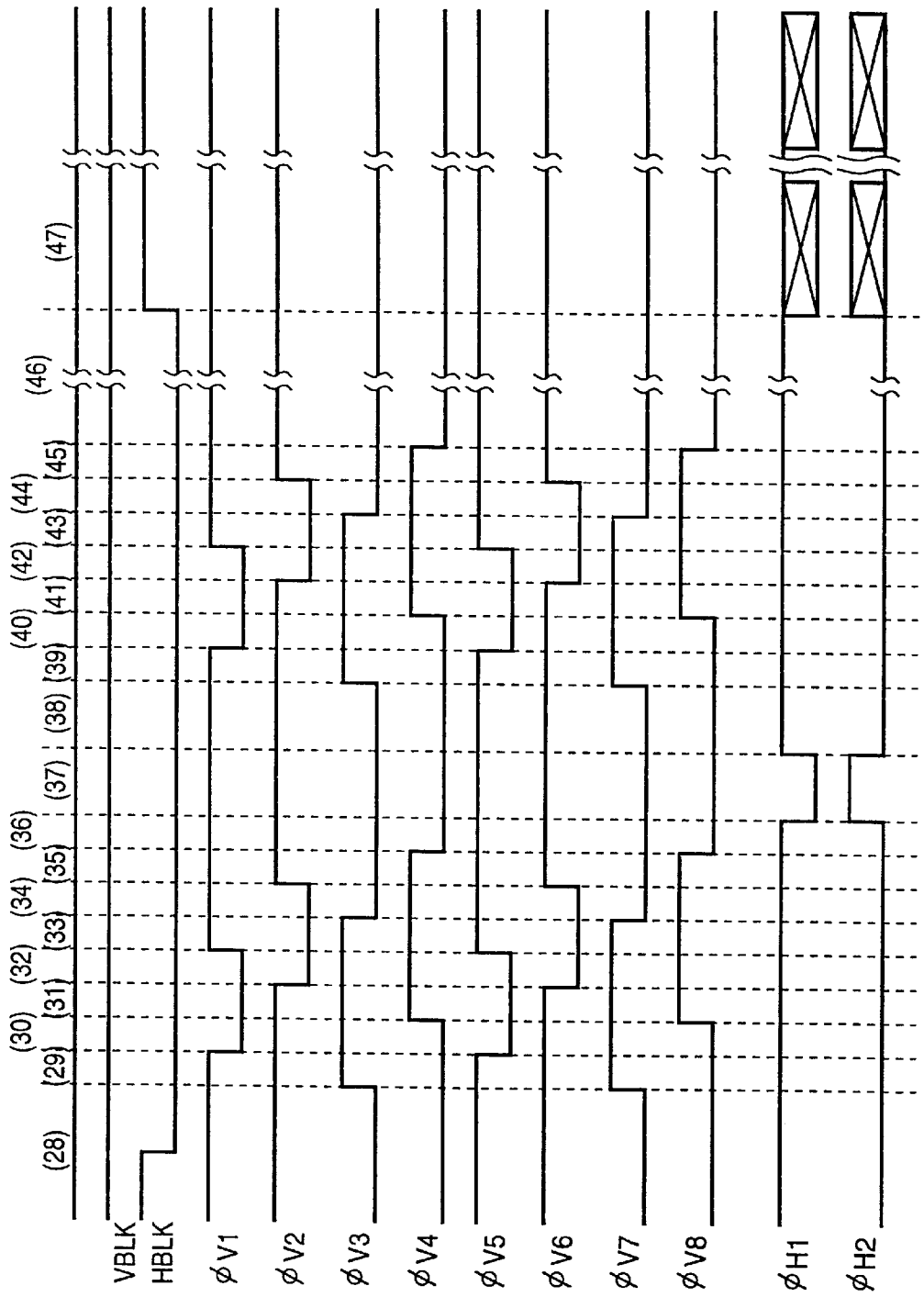

Next, the second operation method of the present invention, i.e., a case of skipping predetermined rows (line-skip reading operation), is explained. FIGS. 5A to 5C are timing charts showing operation pulses to be provided to the image sensing device in the second operation method. Further, FIG. 6A to 6C show a potential state of each CCD of the VCCDs 102 and the HCCD 103 and how the charges are transferred when the operation pulses shown in FIGS. 5A to 5C are provided to the image sensing device.

When the operation pulses as shown in FIG. 5A are provided to the image sensing device, first in the period (3) in the vertical blanking period, charges stored in pixels in the (n−2)-th row, the (n−6)-th row, the (n−10)-th row, and so on, namely charges in every four row are read out to the CCDs 118 (V3) of the VCCDs 102 in response to the operation pulse φV3. The read charges are sequentially transferred through the VCCDs 102 in the vertical direction in response to the operation pulses as shown in FIG. 5A in the periods (4) to (9). Further, in the period (10), in response to the signal read pulse φV1, charges stored in the pixels 101 in the (n−3)-th row, the (n−7)-th row, the (n−11)-th row, and so on, namely charges in every four row, are transferred to the CCDs 116 (V1) of the VCCDs 102. With the above operation, charges stored in pixels in two successive rows out of four rows are read out to the VCCDs 102. In other words, signal charges in two rows out of four rows are skipped, and the charges in these skipped rows are left in the pixels 101.

Figure 6B:
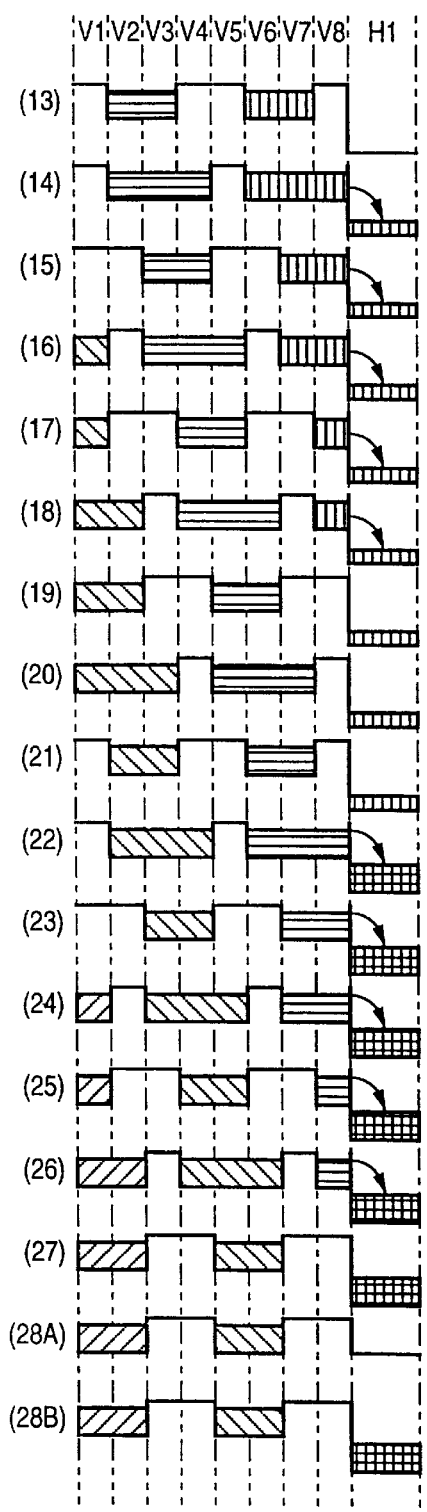
Figure 6C:
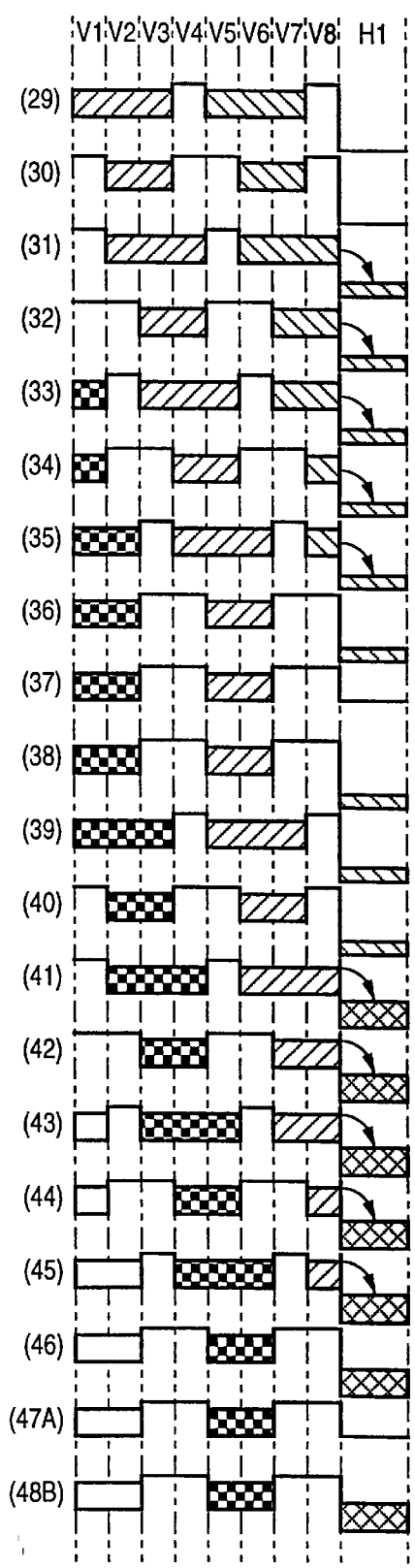

Further, in the periods (13) to (27) in the horizontal blanking period, operation pulses as shown in FIG. 5B are provided, and the potential state of each CCD of the VCCDs 102 changes as shown in FIG. 6B. Therefore, as seen from FIG. 6B, the charges in the VCCDs 102 are sequentially transferred in the vertical direction. By the period (21), the charges in the (n−2)-th row are transferred to the CCDs 124 (H1) of the HCCD 103, and in the periods (22) to (27), the charges in the (n−3)-th row are transferred to the CCDs 124 of the HCCD 103. Thus, the charges in the (n−2)-th row and the charges in the (n−3)-th row are added in the CCDs 124 of the HCCD 103. In other words, charges in each pair of adjoining pixels in the vertical direction in the (n−2)-th row and in the (n−3)-th row are added. Furthermore, by alternatively providing operation pulses having opposite polarities as φOH1 and φH2, in the period (28) in FIG. 5B, the potential states in the periods (28A) and (28B) in FIG. 6B are alternatively repeated. Accordingly, the charges in the HCCD 103 are transferred in the horizontal direction, converted into voltage signals by the charge detector 104, then sequentially outputted from the output terminal 105 as time-sequential image signals.

In the periods (29) to (46) in the next horizontal blanking period, operation pulses as shown in FIG. 5C are provided. In this case, as seen from FIG. 6C, charges in the (n−6)-th row are transferred to the HCCD 103 by the period (36). Then, in accordance with the operation pulses φH1 and φH2 in the periods (37) and (38), the charges in the HCCD 103 are shifted by one pixel (i.e., two CCDs) in the horizontal direction. Thereby, in the period (38) in FIG. 6C, in the CCD 124 (H1) of a given column, there is a charge of the (n−6)-th row of the next column. Subsequently, by applying operation pulses as shown in the periods (39) to (46) in FIG. 5C, charges in the (n−7)-th row is transferred to the HCCD 103. Therefore, in the period (46), the charge of a given column in the (n−7)-th row and the charge of its adjoining column (shifted by one pixel in the horizontal direction) in the (n−6)-th row are added. In other words, charges stored in pairs of pixels adjoining in the oblique direction in the (n−6)-th row and in the (n−7)-th row are added.

Then, in the period (47), respective operation pulses having opposite polarities are alternatively provided as φH1 and φH2, thereby outputting the charges in the horizontal CCD 103 to outside from the output terminal 105. Thereafter, by repeating the operation in the periods (3) to (28) and the operation in the periods (29) to (47), namely, the operation for adding charges stored in two adjoining pixels in the vertical direction and the operation for adding charges stored in two adjoining pixels in the oblique direction, it is possible to read out image signals of an image while skipping two rows per four rows. In the next field period, the charges in the rows which were skipped in the previous field period are read. As for the reason of repeating the above-described two kinds of operations, it will be understood from the explanation of processing, which will be explained later, for generating color image signals from signals read from the image sensing device.

Figure 7:
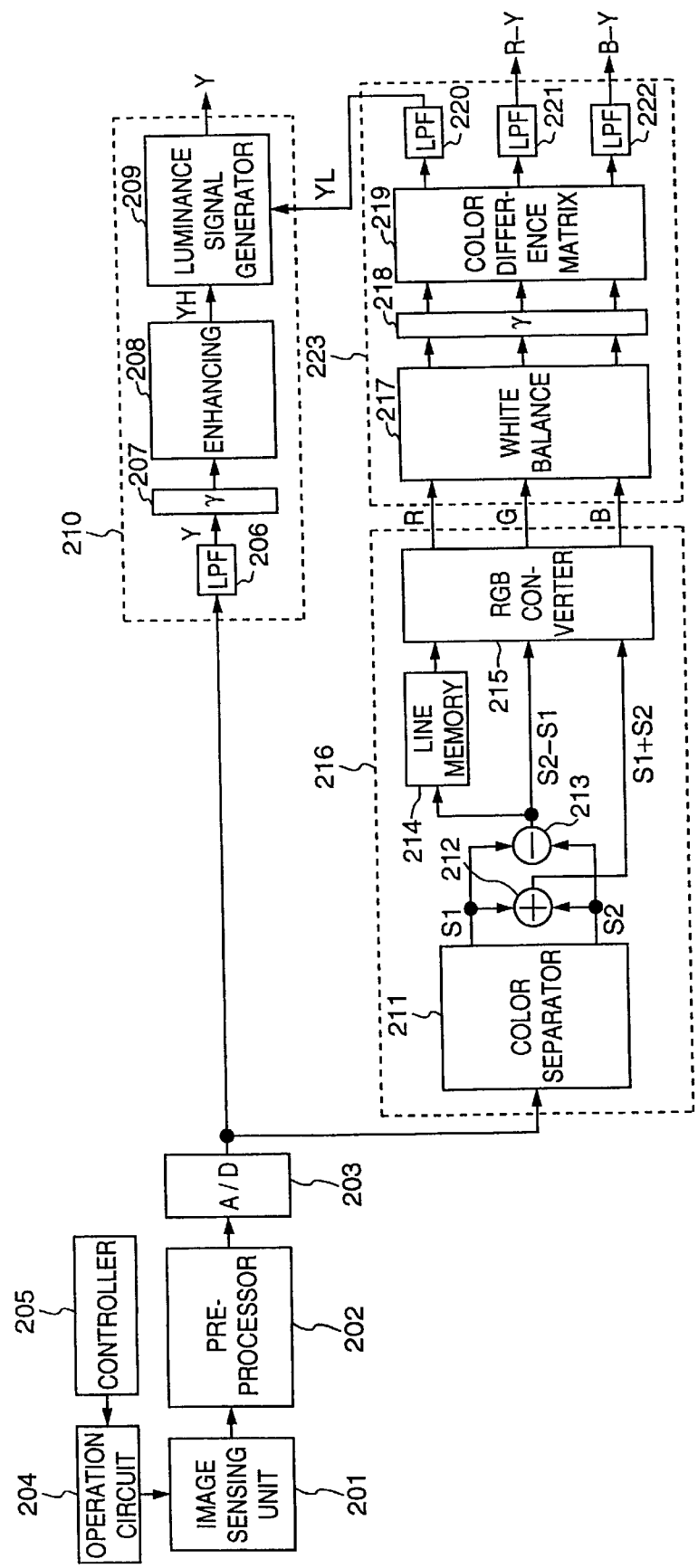
FIG. 7 is a block diagram illustrating a configuration of an image sensing apparatus according to the first embodiment of the present invention.

FIG. 7 shows a block diagram illustrating a configuration of an image sensing apparatus according to the first embodiment of the present invention.

In FIG. 7, reference numeral 201 denotes an image sensing unit including an optical low-pass filter, a lens unit, and the image sensing device shown in FIG. 1; 202, a pre-processor for signals output from the image sensing unit 201, which includes a correlated double sampling (CDS) circuit and an automatic gain controller (AGC); 203, an analog-digital (A/D) converter for converting input analog signals into digital signals; 204, an operation circuit for generating timing pulses for operating the image sensing device of the image sensing unit 201; and 205, a controller for controlling the operation circuit 204.

Further, reference numeral 206 denotes a low-pass filter (LPF) for controlling frequency of an input signals into a predetermined frequency range; 207, a γ correction circuit; 208, an enhancing circuit; 209, a luminance signal generator for generating and outputting a luminance signal Y from a high-frequency luminance signal outputted from the enhancing circuit 208 and a signal outputted from a LPF 220; 211, a color separator for separating the input signal into different color signals; 212, an adder; 213, a subtractor; 214, a line memory; 215, an RGB converter for converting three input signals into signals of three primary colors; 217, a white balance circuit; 218, a γ correction circuit; 219, a color difference matrix circuit for generating a luminance signal and color difference signals from the input signals of the primary colors; and 220, 221 and 222, low-pass filters (LPFS) and a low-frequency luminance signal YL is outputted from the LPF 220, a color difference signal R-Y is outputted from the LPF 221, and a color difference signal B-Y is outputted from the LPF 222. A portion 210 encircled by a broken line is a luminance signal processing unit, a portion 216 encircled by other broken line is a color separating unit, and a portion 223 encircled by other broken line is a color signal processor.

Referring to FIG. 7, image signal processing performed in this image sensing apparatus is explained. As described above, the image sensing device of the image sensing apparatus is operated in two different operation methods, namely, the normal reading operation in which signals are read without skipping rows, and the line-skip reading operation in which signals are read while skipping predetermined rows. Accordingly, image signal processing performed in correspondence with the normal reading operation (the first operation method) will be explained.

The operation circuit 204 controlled by the controller 205 provides the operation pulses as shown in FIG. 3 to the image sensing unit 201, thus the image sensing device is operated in the normal reading operation as described above, and image signals are outputted.

The image signals read in the normal reading operation are the sums of the charges stored in pairs of pixels in the even rows and their adjoining odd rows, as described above. Since the arrangement of the color filter is as shown in FIG. 2, signals outputted by adding charges in the n-th row and in the (n−1)-th row are:

$$[Mg+Cy], [G+Ye], [Mg+Cy], [G+Ye], \qquad (1)$$

and signals outputted by adding charges in the (n−2)-th row and in the (n−3)-th row are:

[G+Cy], [Mg+Ye], [G+Cy], [Mg+Ye],  (2)

Here, Mg, Cy, G and Ye denote charge signals stored in pixels which are covered with the color filter chips of Mg, Cy, G and Ye, respectively. The signals (1) and (2) are sequentially and repeatedly outputted, thereby outputting image signals of a frame image.

Correlated double sampling processing and automatic gain control processing are performed on the image signals read from the image sensing unit 201 in the above order by the pre-processor 202. Thereafter, the image signals are converted from analog signals into digital signals by the A/D converter 203, then inputted to the luminance signal processing unit 210 and the color separating unit 216. The image signals inputted to the luminance signal processing unit 210 are the image signals (1) and (2), therefore, by limiting the frequency range of the image signals by the LPF 206, the following signals are obtained.

From the signals (1) which are the sums of signals of the n-th row and the (n−1)-th row, $$Y=[Mg+Cy]+[G+Ye]=2R+3G+2B \quad (3)$$

is obtained, and from the signals which are the sums of signals of the (n−2)-th row and the (n−3)-th row, $$Y=[G+Cy]+[Mg+Ye]=2R+3G+2B \quad (4)$$

is obtained. In the equations (3) and (4), R, G and B denote signal values of three primary colors, R, G and B, respectively. Here, the values of R, G and B in the equation (3) and the values of R, G and B in the equation (4) are actually different, however, since they are obtained from charge signals stored in the adjacent pixels, they are considered as substantially the same. Thus, these values, R, G and B, in the equations (3) and (4) are treated as the same values, respectively, in the following calculations.

These values are used as signals corresponding to luminance signals, and applied with predetermined processes in the γ correction circuit 207 and in the enhancing circuit 208, then outputted to the luminance signal generator 209 as a luminance signal YH which includes a high frequency component. In this case, a low-frequency luminance signal YL generated in a method which will be explained later is also provided to the luminance signal generator 209, and the luminance signal generator 209 combines these signals and outputs a resultant signal as a luminance signal Y.

Next, processing for signals inputted to the color separating unit 216 will be explained. In the color separating unit 216, color signals are separated from the signals sequentially outputted from the image sensing device and signals of three primary colors, namely, R, G and B signals, are generated. When the signals (1) are inputted to the color separator 211, then the color separator 211 separates the input signals into:

$$S1=[G+Ye] \quad (5)$$

$$S2=[Mg+Cy] \quad (6)$$

Since the input signals are sequential signals, each color signal is outputted as every other pixel, such as, S1, S2, S1, S2, . . . , it is not possible to reproduce colors. Therefore, it is necessary to interpolate signals so that an image signal of every pixel is generated on the basis of the four color components. As for the interpolation method, there are pre-interpolation method in which a signal of missing color components for a pixel is interpolated with a signal of the previous pixel, and average value interpolation method in which a signal of missing color components for a pixel is interpolated with the average of signals of the previous and next pixels.

The signals separated by the color separator 211 are added in the adder 212, then subtracted by the subtractor 213. The signals outputted from the adder 212 and the subtractor 213 are as follow, respectively.

$$S1+S2=[G+Ye]+[Mg+Cy]=2R+3G+2B \quad (7)$$

$$S2-S1=[Mg+Cy]-[G+Ye]=2B-G \quad (8)$$

Similarly, when the signals (2) are inputted to the color separator 211, then, $$S1=[G+Cy]$$

$$S2=[Mg+Ye]$$

and $$S1+S2=[G+Cy]+[Mg+Ye]=2R+3G+2B \quad (9)$$

$$S2-S1=[G+Cy]-[Mg+Ye]=2R-G \quad (10)$$

are outputted.

The signals outputted from the adder 212 and the subtractor 213 are inputted to the RGB converter 215. At the same time, the signal outputted from the subtractor 213 is inputted into the line memory 214 where the signals are delayed for one horizontal scan line period, then the delayed signals are inputted to the RGB converter 215. Therefore, when the signals shown in the equations (9) and (10) are inputted to the RGB converter 215, the signal shown in the equation (8) is also inputted to it.

The RGB converter 215 performs the following operations and generates signals of three primary colors, i.e., R, G and B signals.

$$G=\{(S1+S2)-(S2-S1)-(S2-S1)'\}/5=\{2R+3G+2B-(2R-G)-(2B-G)\}/5 \quad (11)$$

$$R=\{(S2-S1)+G\}/2=\{(2R-G)+G\}/2 \quad (12)$$

$$B=\{(S2-S1)'+G\}/2=\{(2B-G)+G\}/2 \quad (13)$$

Note, (S2−S1)' denotes a signal delayed for one horizontal scan line period provided from the line memory 214.

For the next row, a G signal is calculated by using the equation (11), and R and B signals are obtained by performing the following calculation:

$$R=\{(S2-S1)'+G\}/2=\{(2R-G)+G\}/2 \quad (14)$$

$$B=\{(S2-S1)+G\}/2=\{(2B-G)+G\}/2 \quad (15)$$

The R, G and B signals outputted from the RGB converter 215 enter the white balance circuit 217 where the white balance of the R, G and B signals are corrected, then are performed with γ correction processing in the γ correction circuit 218, and inputted to the color difference matrix circuit 219.

The color difference matrix circuit 219 performs the following operation to generate the low-frequency luminance signal YL and the color difference signals R-Y and B-Y.

$$\begin{bmatrix} YL \\ R-Y \\ B-Y \end{bmatrix} = \begin{bmatrix} 0.30 & 0.59 & 0.11 \\ 0.70 & -0.59 & -0.11 \\ -0.30 & -0.59 & 0.89 \end{bmatrix} \begin{bmatrix} R^\gamma \\ G^\gamma \\ B^\gamma \end{bmatrix} \quad (16)$$

After frequency ranges of the signals outputted from the color matrix circuit 219 are limited to predetermined frequency ranges by the LPFs 220, 221 and 222, the low-frequency luminance signal YL enters the luminance signal generator 209, and the color difference signals R-Y and B-Y are outputted from the LPFs 221 and 222. Image signals obtained as above are applied with predetermined signal processes in not-shown circuits and converted into signals of a predetermined format, then recorded in a variety of recording media, displayed on display devices, or outputted to outside.

In the next field period, charges of two adjoining rows of different combination are added, and charges in the (n−1)-th row and the (n−2)-th row, and charges in the (n−3)-th row and the (n−4)-th row, and so on, are read out as being added. Therefore, the signals read in this field period are:

$$[Cy+G], [Ye+Mg], [Cy+G], [Ye+Mg] \quad (17)$$

in the (n−1)-th row and the (n−2)-th row, and $$[Cy+Mg], [Ye+G], [Cy+Mg], [Ye+G] \quad (18)$$

in the (n−3)-th row and the (n−4)-th row. Signals (17) and (18) are alternatively read out. Since the signals (17) and (18) are the same as the signals (2) and (1), respectively, thus the subsequent processes are the same as those performed in the previous field period, and the explanation of them are omitted.

Next, image signal processing for the line-skip reading operation is explained. The operation circuit 204 controlled by the controller 205 provides operation pulses as shown in FIGS. 5A to 5C to the image sensing unit 201, thereby the image sensing device is operated in the line-skip reading operation, and image signals are outputted. Here, the image signals in the n-th row and the (n−1)-th row are skipped without being read, as described above. Next, charges stored in pairs of adjoining pixels in the vertical direction in the (n−2)-th row and the (n−3)-th row are added and outputted. Further, the image signals in the (n−4)-th row and the (n−5)-th row are skipped, and the charges of the (n−6)-th row are shifted by one pixel in the horizontal direction and the charges in the (n−7)-th row are added to them, thereby the sums of the charges stored in pairs of adjoining pixels in the oblique direction are outputted. By repeating the aforesaid reading operation, image signals of one frame image is outputted.

Since the arrangement of the color filter covering the image sensing device is as shown in FIG. 2, outputted signals obtained by adding the charges in the (n−2)-th row and the (n−3)-th row are, $$[G+Cy], [Mg+Ye], [G+Cy], [Mg+Ye] \quad (19)$$

and outputted signals obtained by adding the charges in the (n−6)-th row and the (n−7)-th row are, $$[G+Ye], [Mg+Cy], [G+Ye], [Mg+Cy] \quad (20)$$

The signals (19) and (20) are repeatedly outputted sequentially, and image signals of one frame image are outputted. The signals (19) and (20) are the same as the signals (2) and (1), respectively, the signals read from the image sensing unit 201 in the line-skip reading operation are also processed by the luminance signal processing unit 210, the color separating unit 216, and the color signal processor 223 in the same manner as performed in the normal reading operation to form color image signals. Therefore, the detailed explanation is omitted.

Further, in the next field period, signals in the rows which are skipped in the previous field period are read out. More specifically, signals stored in pairs of adjoining pixels in the vertical direction in the n-th row and the (n−1)-th row are added and read, then signals stored in pairs of adjoining pixels in the oblique direction in the (n−4)-th row and the (n−5)-th row are added and read. The read signals in this field period are the same as those read in the previous field period, as seen from the arrangement of the filter as shown in FIG. 2, the same signal processing is applied in the same manner as described above.

It should be noted that a case where eight operation pulses are used to operate VCCDs of the image sensing device is explained above, however, the present invention is not limited to this, and it is possible to realize other pattern of skipping rows by increasing the number of operation pulses for operating the VCCDs. For example, by separately operating CCDs of the VCCDs with sixteen operation pulses, it is possible to skip six rows out of eight rows, in addition to skipping two rows out of four rows. When six rows out of eight rows are skipped, it is possible to generate color image signals by applying the above signal processing to the read signals of two rows out of four rows, as seen from the arrangement of the color filter shown in FIG. 2.

According to the first embodiment, from the image sensing device comprising a plurality of pixels arranged in two dimension, signals can be read while skipping predetermined rows, and color image signals can be generated from the read signals. Therefore, in a case where the number of pixels of an image sensing device is larger than that of an output device, it is possible to omit processes of reading charges stored in all the pixels of the image sensing device and storing read image signals in a storage medium, such as a memory, further, it is possible to omit the memory and a processing circuit which have been required to thinning down the image signals. Further, by reading signals while skipping rows, time for reading image signals of an image is shortened.

<Second Embodiment>

An arrangement of a color filter provided in front of an image sensing device used in an image sensing apparatus according to the second embodiment is shown in FIG. 8. This arrangement of the color filter is disclosed by the applicants of the present invention in the Japanese Patent Application Laid-Open No. 6-205422, in which the color filter is used in an image sensing device of an image sensing apparatus capable of sensing an image of high resolution with less moiré and a still frame image. The color filter shown in FIG. 8 has an offset sampling structure. By separately reading signals of all the pixels of the image sensing device for forming an image, less color carrier signals in the horizontal and vertical directions are generated. Accordingly, color moiré in the horizontal and vertical directions caused by the color carrier signals are reduced, thereby an image of the possible highest resolution in this configuration can be obtained.

Referring to FIG. 8, the color filter includes four color filter chips of cyan (Cy), yellow (Ye), green (G), and magenta (Mg), having different spectral characteristics. Different combinations of color filter chips of two colors are used in the even rows and in the odd rows (in FIG. 8, a combination of Cy and Ye and a combination of G and Mg) and alternatively arranged in the horizontal direction. The filter chips in the even rows and the odd rows are shifted by one pixel in the horizontal direction in every even and odd row, respectively, therefore, the filter chips in the even rows form a check pattern, and so do the filter chips in the odd rows.

An operation method for operating an image sensing device covered with the color filter shown in FIG. 8 will be explained below. In the second embodiment, there are two operation methods; one is the third operation method for separately reading signals of all the pixels of the image sensing device and the other is the fourth operation method for reading signals while skipping rows (line-skip reading operation), similarly to the first embodiment. The third operation method will be explained first.

Figure 9A:
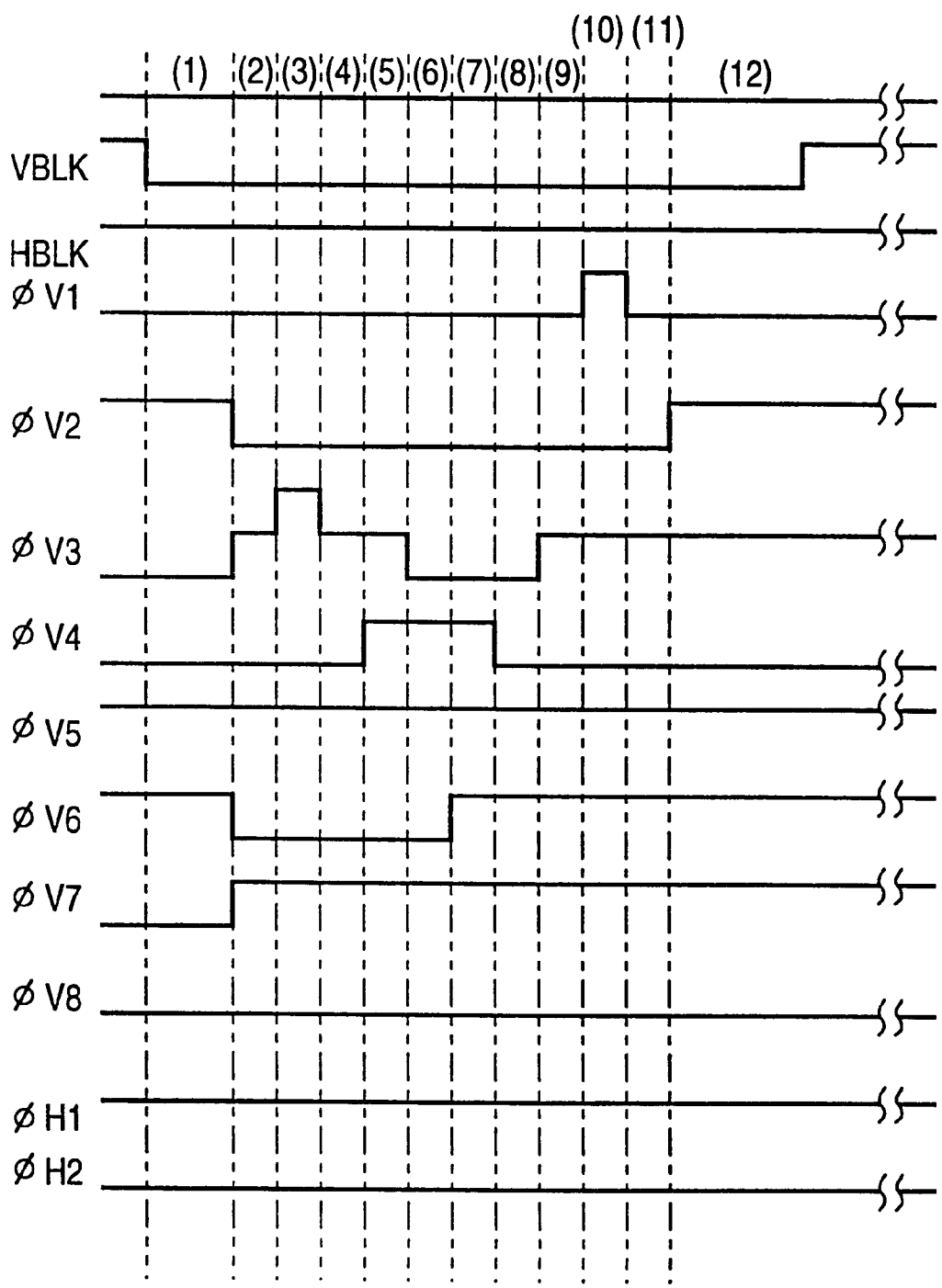
FIGS. 9A to 9C are timing charts of operation pulses used in a reading operation for independently reading signals of all the pixels from the image sensing device according to the second embodiment of the present invention.
Figure 9B:
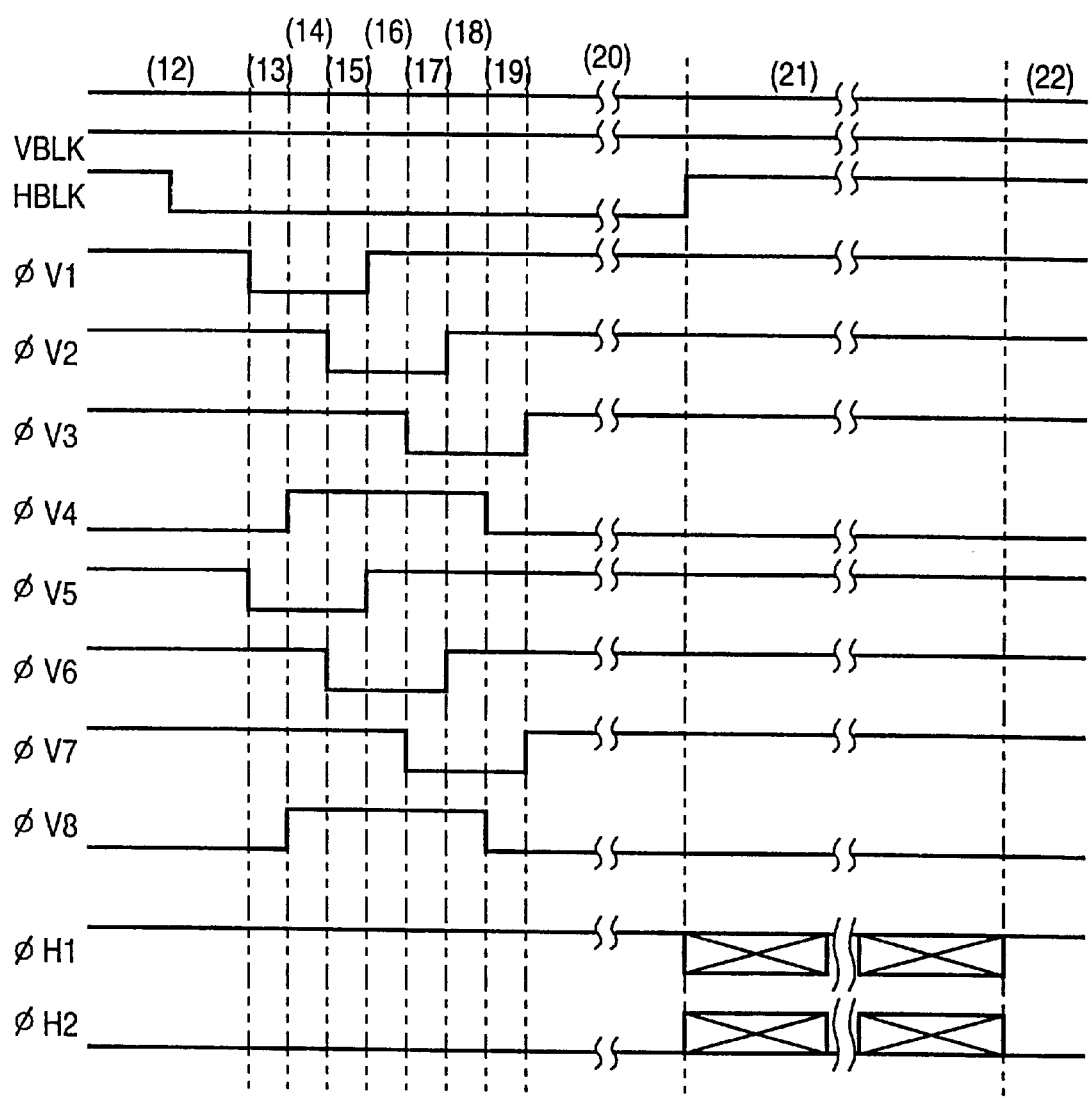
Figure 9C:
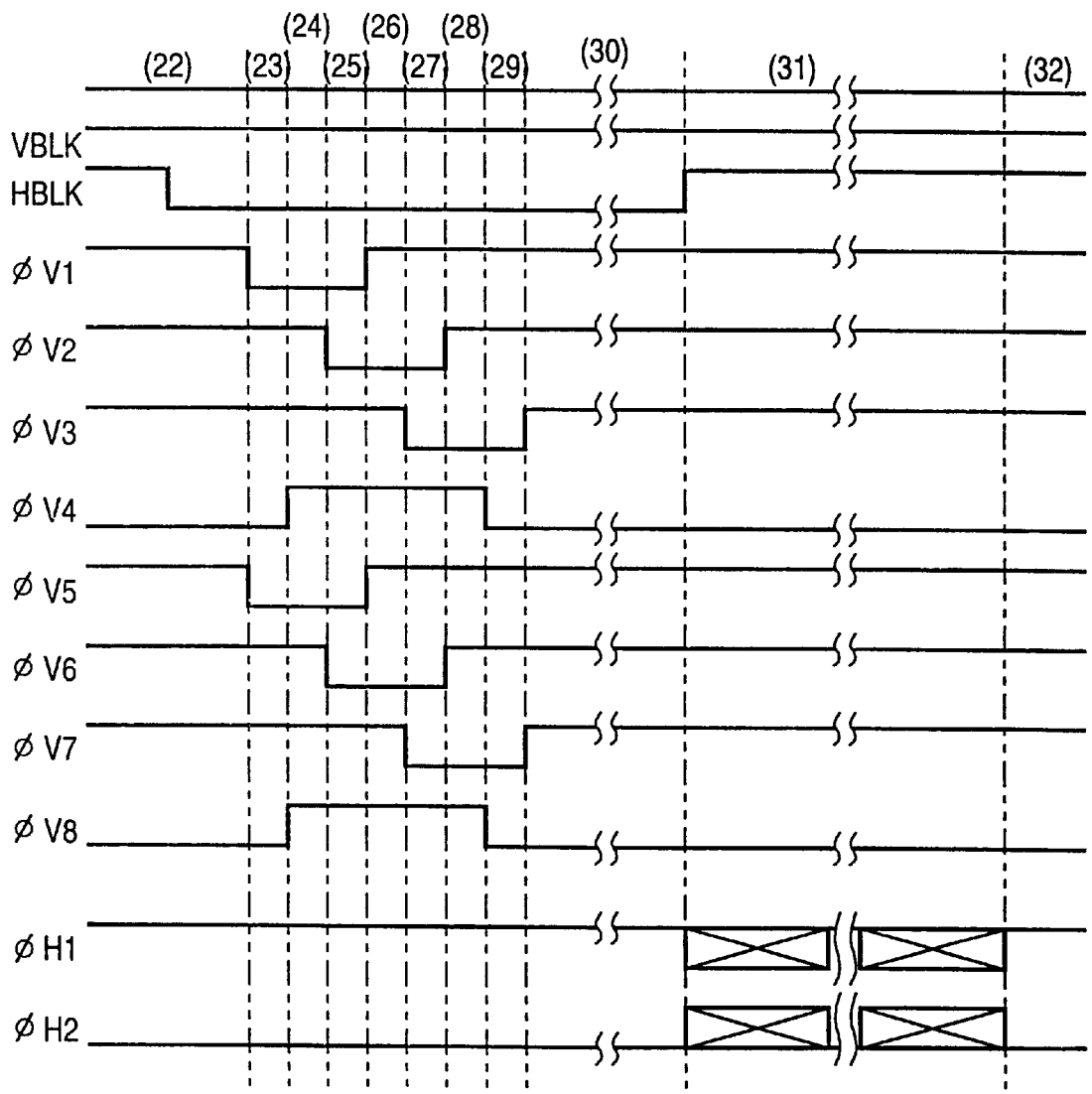
Figure 10A:
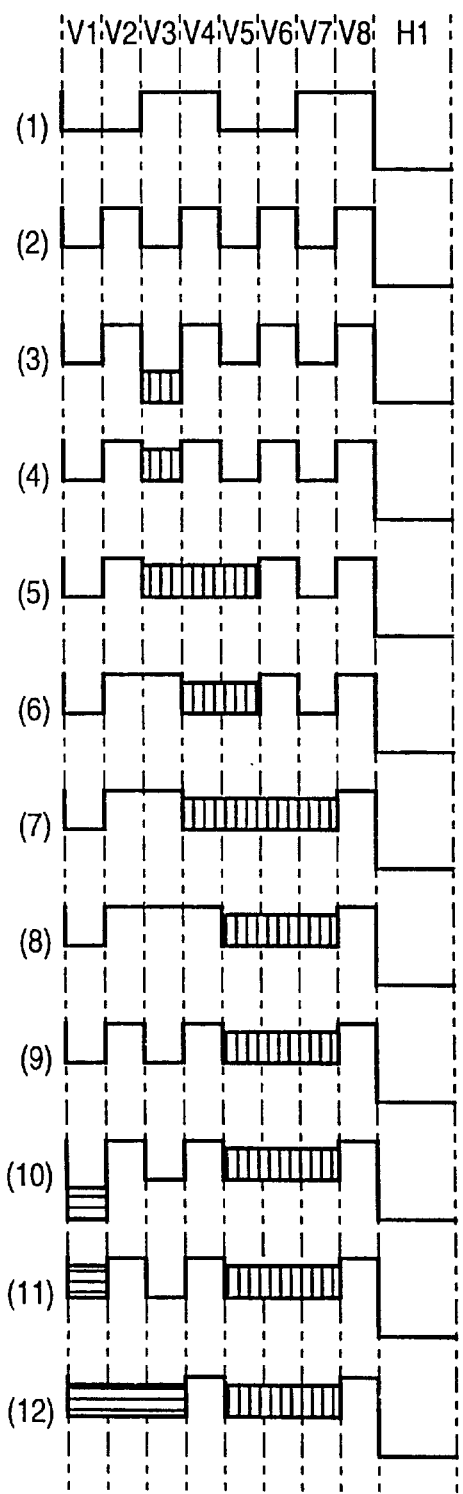
FIGS. 10A to 10C are timing charts for explaining transference of charges in the reading operation for independently reading signals of all the pixels from the image sensing device according to the second embodiment of the present invention.

FIGS. 9A to 9C show operation pulses to be provided to the image sensing device in the third operation method. Further, FIGS. 10A to 10C shows a potential state of each CCD of the VCCDs 102 and the HCCD 103 and how the charges are transferred when the operation pulses shown in FIGS. 9A to 9C are supplied to the image sensing device.

When the operation pulses as shown in FIG. 9A are provided to the image sensing device, first in the period (3) in a vertical blanking period, signal charges stored in pixels in the (n−2)-th row, the (n−6)-th row, the (n−10)-th row, and so on, namely in every four row, are read out to the CCDs 118 (V3) of the VCCDs 102 in response to the operation pulse φV3. The read charges are sequentially transferred through the VCCDs 102 in the vertical direction in response to the operation pulses as shown in FIG. 9A in the periods (4) to (9). Further, in the period (10), in response to the signal read pulse φV1, signal charges stored in the pixels 101 in the (n−3)-th row, the (n−7)-th row, the (n−11)-th row, and so on, namely in every four row, are transferred to the CCDs 116 (V1) of the VCCDs 102. With the above operation, signal charges stored in pixels in two successive rows out of four rows are read out to the VCCDs 102.

Figure 10B:
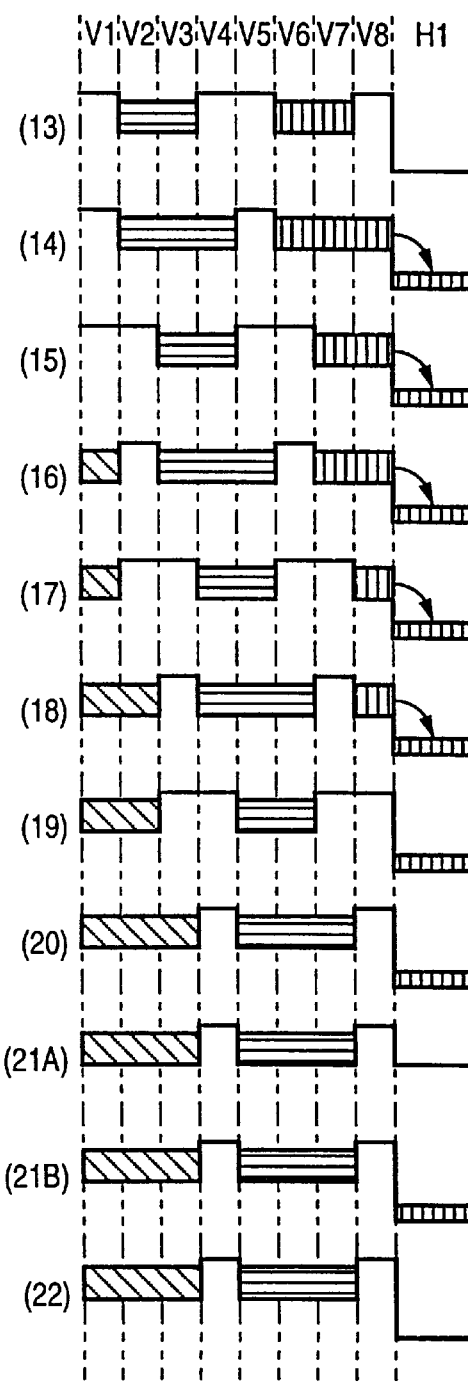
Figure 10C:
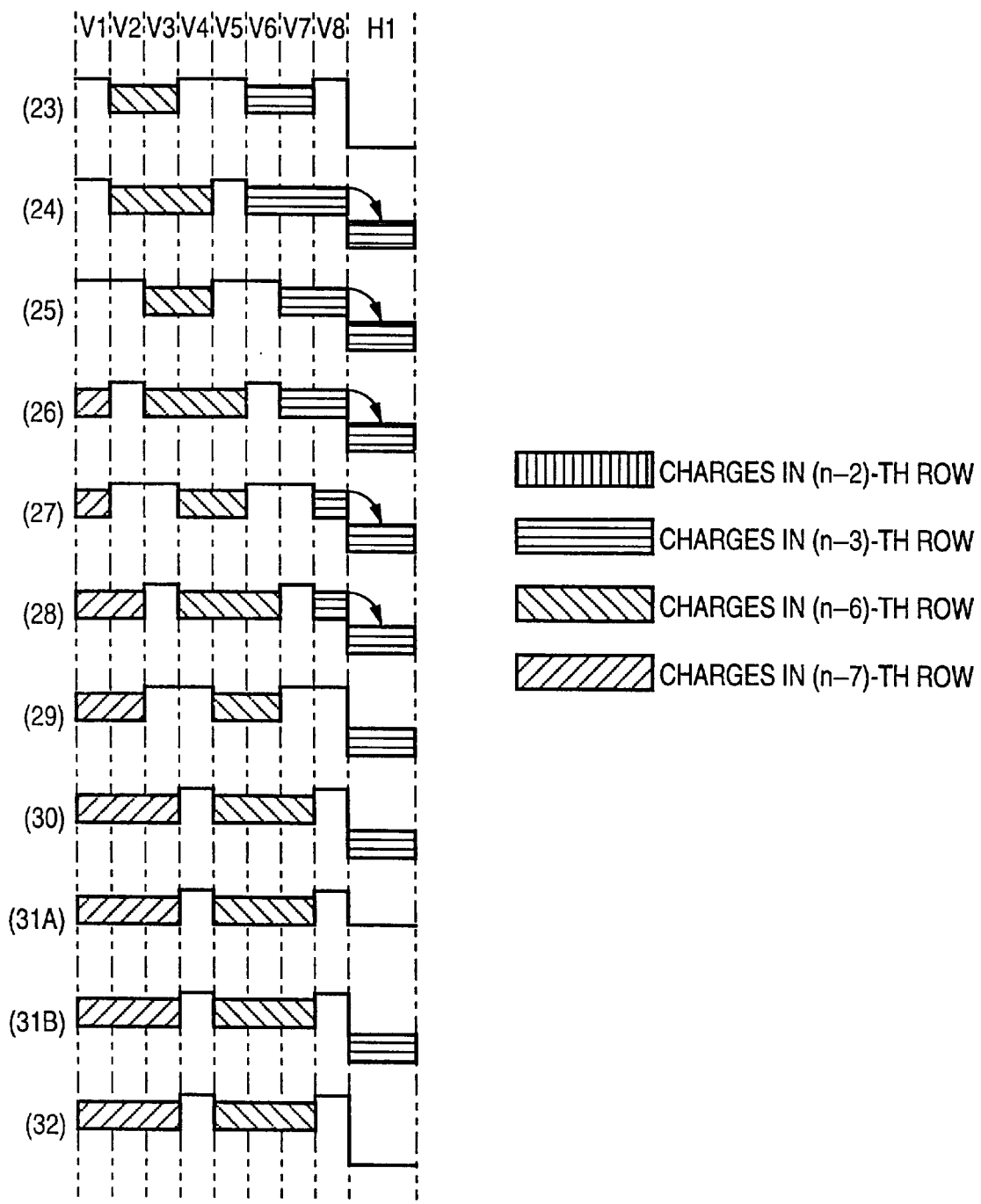

Further, in the periods (13) to (20) in the horizontal blanking period, operation pulses as shown in FIG. 9B are provided, and the potential state of each CCD of the VCCDs 102 changes as shown in FIG. 10B. Therefore, as seen from FIG. 10B, the signal charges in the VCCDs 102 are sequentially transferred in the vertical direction. By the period (20), the charges in the (n−2)-th row are transferred to the CCDs 124 (H1) of the HCCD 103. Further, by applying operation pulses φH1 and φH2, as shown in FIG. 9B, in the period (21) having opposite polarities alternatively, the potential states as in the periods (21A) and (21B), in FIG. 10B, are repeated. Accordingly, the signal charges in the HCCD 103, i.e., the charges in the (n−2)-th row here, are transferred in the horizontal direction, converted into voltage signals by the charge detector 104, then sequentially outputted from the output terminal 105 as time-sequential image signals. In the next horizontal scan line period, operation pulses as in the periods (23) to (32) shown in FIG. 9C are provided, and the charges in the (n−3)-th row are outputted from the output terminal 105 as time-sequential image signals.

By repeating the aforesaid processes, signals of adjoining two rows out of four rows, e.g., the (n−2)-th row, the (n−3)-th row, the (n−6)-th row, the (n−7)-th row, and so on, in this field are separately read out. Thus, image signals of an entire image can be separately read in two field periods.

In the first embodiment, in a case where line-skipping is not performed, signals in two rows are added and read by operating the image sensing device with the operation pulses shown in FIG. 3. In the second embodiment, signals of all the rows of the image sensing device are separately read by using the operation pulses shown in FIGS. 9A to 9C. This is because the arrangement of the color filter on the image sensing device is as shown in FIG. 8. If signals in two rows are added and read from the image sensing device, similarly to the first embodiment, it is impossible to generate color image signals from the read image signals in the subsequent signal processing. Further, because two field periods are required to read out signals of an entire image in the third operation method in the second embodiment, the method is suitable for sensing a still image rather than sensing a moving image.

Next, the fourth operation method, namely a line-skip reading operation, is explained. Operation pulses to be provided to the image sensing device in the fourth operation method are the same as those shown in FIGS. 5A to 5C which are used in the second operation method in the first embodiment. Further, the potential state of each CCD of the VCCDs 102 and the HCCD 103 and how charges are transferred are as shown in FIGS. 6A to 6C. Therefore, signals read in the fourth operation method are the sums of signals in the two adjoining rows out of four rows. More specifically, the sums of charges stored in pairs of adjoining pixels in the vertical direction and the sums of charges stored in pairs of adjoining pixels in the oblique direction are alternatively outputted, as in the second operation method in the first embodiment. Further, in the next field period, signals in other two rows which were skipped in the previous field period are read. Accordingly, signal charges in successive two rows are read while skipping two rows.

Figure 11:
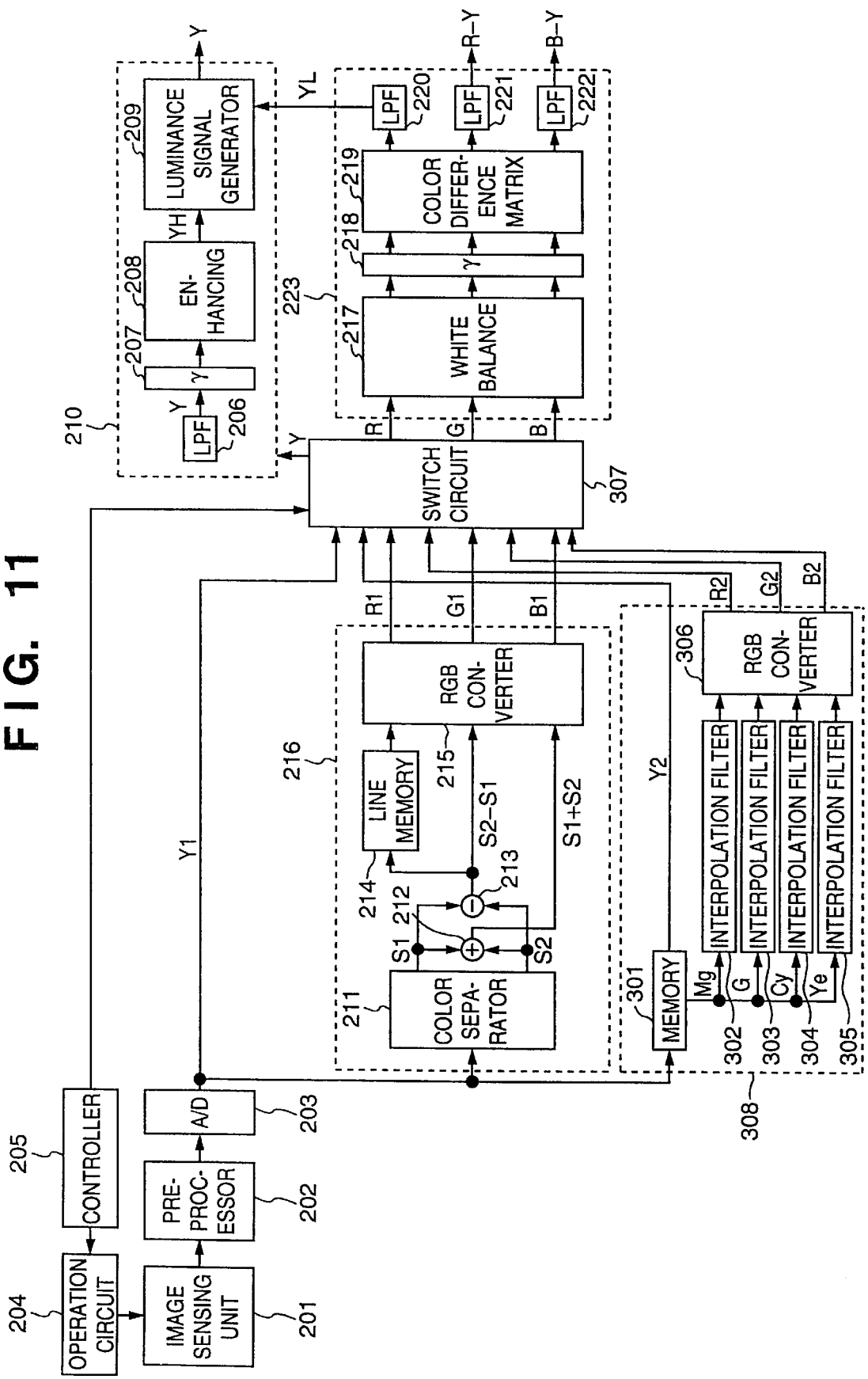
FIG. 11 is a block diagram illustrating a configuration of an image sensing apparatus according to the second embodiment of the present invention.
Figure 12:
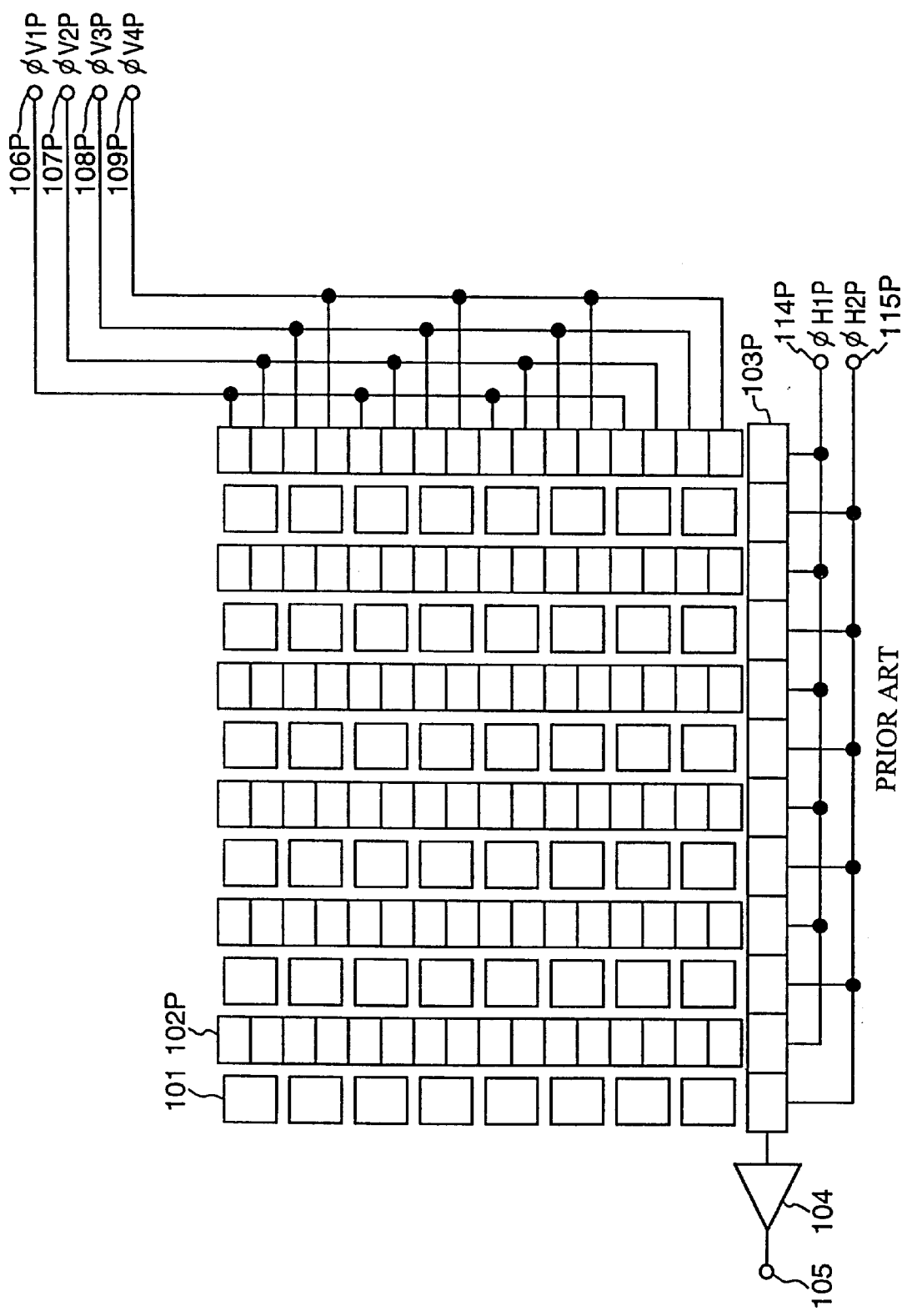
FIG. 12 is a view showing a configuration of an interline-type solid-state image sensing device used in a conventional image sensing apparatus.

FIG. 11 is a block diagram illustrating a configuration of an image sensing apparatus according to the second embodiment of the present invention. In FIG. 11, the same units and elements as those in FIG. 7 are referred by the same reference numerals and explanations of those are omitted.

In FIG. 11, reference numeral 301 denotes a memory for storing input signals; 302 to 305, interpolation filters for synchronizing input image data; 306, an RGB converter for converting input signals of four colors (Mg, G, Cy, and Ye) to signals of three primary colors, namely, R, G, and B signals; and 307, a switch circuit for selecting either signals outputted from the color separating unit 216 which is encircled by a broken line, or signals outputted from a block 308 which is encircled by other broken line, and outputting the selected signals.

Image signal processing performed in the image sensing apparatus of the second embodiment is explained below with reference to FIG. 11. Since two operation methods for operating the image sensing device are used in the second embodiment as described above, and the signal processing for the third operation method is explained first.

The operation circuit 204 controlled by the controller 205 provides the operation pulses as shown in FIGS. 9A to 9C to the image sensing unit 201 and the image sensing device is operated, image signals are outputted. Image signals read from the image sensing unit 201 are performed with correlated double sampling processing and automatic gain control processing by the pre-processor 202, converted from analog signals into digital signals in the A/D converter 203, then temporally stored in the buffer memory 301 for two dimensional processing which is performed later. At this point, the signals of one frame image are read out in two field periods from the image sensing unit 201, as described above, the signals obtained in two filed periods are stored in the buffer memory 301.

Further, signals to be applied with signal processing are read from the buffer memory 301. Signals Y2 which correspond to luminance signals are sequentially read from the buffer memory 301 in the order corresponding to the arrangement of the color filter, as shown in FIG. 8, on the image sensing device, then inputted to the switch circuit 307. The switch circuit 307 is controlled by the controller 205 so as to output the signals provided from the block 308 to the luminance signal processing unit 210. The luminance signal processing unit 210 has the same configuration as shown in FIG. 7, and the same processes as in the first embodiment are applied to input signals, then a luminance signal Y is outputted. Meanwhile, signals corresponding to color signals Mg, G, Cy, and Ye are also read from the buffer memory 301, synchronized by the four interpolation filters 302 to 305, inputted to the RGB converter 306, and converted into R, G and B signals. This conversion is performed in accordance with the following matrix operation.

$$\begin{bmatrix} R \\ G \\ B \end{bmatrix} = A \begin{bmatrix} Mg \\ G \\ Cy \\ Ye \end{bmatrix} \quad (21)$$

Here, A is a 3×4 matrix which is optimized so that the spectral characteristics, Mg(λ), G(λ), Cy(λ), and Ye(λ) of the Mg, G, Cy, and Ye filter chips on the image sensing device approach the spectral characteristics, R(λ), G(λ) and B(λ) of the R, G and B filters defined by the NTSC standard. As described above, signals of three primary colors, R2, G2 and B2, outputted from the block 306 are provided to the color signal processing unit 223 via the switch circuit 307 and applied with predetermined processes as in the first embodiment, then a low-frequency luminance signal YL and color difference signals R-Y and B-Y are outputted. The image signals obtained as above are further performed with predetermined processes, and recorded in a recording medium, (not shown) or outputted to outside. In the aforesaid method, however, it requires two field periods to read out signals of one whole image, a still image or a moving image sensed at a frame rate which is one-half of the frame rate of the first operation method in the first embodiment can be obtained. Therefore, in order to sense a moving image at the same frame rate as that of the first operation method, it is necessary to operate the image sensing device in the fourth operation method which reads signals as skipping rows.

Next, processing for the fourth operation method, namely, a line-skip reading operation, is explained. The operation circuit 204 controlled by the controller 205 provides operation pulses as shown in FIGS. 5A to 5C to the image sensing unit 201, as in the line-skip reading operation described in the first embodiment, thereby the image sensing device is operated in the line-skip reading operation, and image signals are outputted. Here, the image signals in the n-th row and the (n−1)-th row are skipped without being read, as in the line-skip reading operation described in the first embodiment. Next, charges stored in pairs of adjoining pixels in the vertical direction in the (n−2)-th row and the (n−3)-th row are added and outputted. Further, the image signals in the (n−4)-th row and the (n−5)-th row are skipped, and the charges of the (n−6)-th row are shifted by one pixel in the horizontal direction and the charges in the (n−7)-th row are added to them, thereby the sums of the charges stored in pairs of adjoining pixels in the oblique direction are outputted. By repeating the aforesaid reading operation, image signals of one frame image is outputted.

Since the arrangement of the color filter covering the image sensing device is as shown in FIG. 8, outputted signals obtained by adding the charges in the (n−2)-th row and the (n−3)-th row are,

[Mg+Cy], [G+Ye], [Mg+Cy], [G+Ye]  (22)

and outputted signals obtained by adding the charges in the (n−6)-th row and the (n−7)-th row are,

[Mg+Ye], [G+Cy], [Mg+Ye], [G+Cy]  (23)

The signals (22) and (23) are repeatedly outputted sequentially, and image signals of one frame image are outputted.

The signals (22) and (23) are the same as the signals (20) and (19) which are outputted from the image sensing device covered with the color filter arranged as shown in FIG. 2 in the first embodiment, respectively, the read signals are also processed by the luminance signal processing unit 210, the color separating unit 216, and the color signal processor 223 in the same manner as performed in the first embodiment to form color image signals. Further, in the next field period, signals in the rows which were skipped in the previous field period are read out. More specifically, signals stored in pairs of adjoining pixels in the vertical direction in the n-th row and the (n−1)-th row are added and read, then signals stored in pairs of adjoining pixels in the oblique direction in the (n−4)-th row and the (n−5)-th row are added and read. The read signals in this field period are the same as those read in the previous field period, as seen from the arrangement of the filter as shown in FIG. 8, the same signal processing is applied in the same manner for generating color image signals.

It should be noted that a case where eight operation pulses are used to operate VCCDs of the image sensing device is explained above, however, similarly to the first embodiment, the present invention is not limited to this, and it is possible to realize other pattern of skipping rows by increasing the number of operation pulses for operating the VCCDs. For example, by separately operating CCDs of the VCCDs with sixteen operation pulses, it is possible to skip six rows out of eight rows, in addition to skipping two rows out of four rows. When six rows out of eight rows are skipped, it is possible to generate color image signals by applying the above signal processing, as seen from the arrangement of the color filter shown in FIG. 8.

According to the second embodiment, from the image sensing device comprising a plurality of pixels arranged in two dimension, signals can be read while skipping predetermined rows, and color image signals can be generated from the read signals. Therefore, the same advantages as in the first embodiment are obtained as well as it is possible to sense a still frame image of higher resolution with less moiré, comparing to an image obtained by using the image sensing device of the first embodiment by adopting an operation method for separately reading signals of all the pixels of the image sensing device.

The present invention is not limited to the above embodiments and various changes and modifications can be made within the spirit and scope of the present invention. Therefore to appraise the public of the scope of the present invention, the following claims are made.

What is claimed is:

1. A method for operating an image sensing device which performs photoelectric conversion and stores converted charges having a plurality of pixels, arranged in two dimensions, said method comprising:
   a first reading step of adding image signals of a plurality of adjoining rows out of every predetermined number of rows while skipping non-added rows and outputting the resultant image signals; and
   a second reading step of adding image signals of a plurality of adjoining rows out of the rows skipped at said first reading step while skipping non-added rows and outputting the resultant image signals.

2. The method for operating an image sensing device according to claim 1, wherein said image sensing device includes a plurality of vertical charge transfer means, each provided along each vertical line of said plurality of pixels, for transferring charges in the vertical direction and horizontal charge transfer means for transferring charges in the horizontal direction, and at least eight operation signals are used for operating said vertical charge transfer means.

3. The method for operating an image sensing device according to claim 2, wherein at each of said first and second reading steps, a reading step of adding signals stored in a plurality of adjoining pixels in the vertical direction in a plurality of rows and outputting the resultant signals and a reading step of adding signals stored in a plurality of adjoining pixels in the oblique direction in a plurality of rows by transferring signals in a row to said horizontal charge transfer means shifting the signals in the horizontal direction by one pixel transferring signals in a next row to said horizontal charge transfer means and repeating the transferring and shifting of signals until the plurality of adjoining pixels are added in said horizontal transfer means and outputting the resultant signals are alternatively performed until one frame is processed.

4. The method for operating an image sensing device according to claim 3, wherein said vertical charge transfer means are operated with eight operation signals to read image signals in two adjoining rows out of every four rows while skipping two rows at said first and second reading steps.

5. The method for operating an image sensing device according to claim 1, wherein the pixels of said image sensing device are covered with a complementary color filter of magenta, green, cyan, and yellow, arranged in such a manner that different combinations of two colors are used in even rows and odd rows and appear alternatively, and the two colors in either the even rows or odd rows are arranged in a check pattern.

6. The method for operating an image sensing device according to claim 1, wherein the pixels of said image sensing device are covered with a complementary color filter of magenta, green, cyan, and yellow, arranged in such a manner that different combinations of two colors are used in even rows and odd rows and appear alternatively, and the two colors in the even rows and the two colors in odd rows are arranged in check patterns.

7. A method for operating an image sensing device which performs photoelectric conversion and stores converted charges having a plurality of pixels arranged in two dimensions, and which covered with a complementary color filter of magenta, green, cyan, and yellow, arranged in such a manner that different combinations of two colors are used in even rows and odd rows and appear alternatively, and the two colors in either the even rows or odd rows are arranged in a check pattern, and a plurality of vertical charge transfer means, each provided along each vertical line of said plurality of pixels, for transferring charges in the vertical direction for transferring charges in the vertical direction and horizontal charge transfer means for transferring charges in the horizontal direction, said method comprising:

a reading step of reading image signals from the image sensing device by operating said vertical charge transfer means with eight operation signals and horizontal charge transfer means with two operation signals by 1) alternatively repeating a process of adding signals stored in pairs of adjoining pixels in the vertical direction in two rows while skipping two rows and outputting the resultant signals from said image sensing device, and a process of adding signals stored in pairs of adjoining pixels in the oblique direction in two rows by transferring signals in a row to said horizontal charge transfer means, shifting the signals in the horizontal direction by one pixel, transferring signals in a next row to said horizontal charge transfer means, and repeating the transferring and shifting of signals until the plurality of adjoining pixels are added in said horizontal transfer means while skipping two rows and outputting the resultant signals until one frame is processed in a field period, then alternatively repeating a process of adding signals stored in pairs of adjoining pixels in the vertical direction in two rows which are skipped previously, and a process of adding signals stored in pairs of adjoining pixels in the oblique direction in two rows which are skipped previously until one frame is processed in a next field period, and 2) by performing a process of adding image signals stored in pairs of adjoining pixels in two rows whose combination are changed every field period and outputting the resultant image signals;

a luminance signal generation step of generating a luminance signal from the image signals of one row and of a previous row obtained at said reading step; and a color difference signal generation step of generating color difference signals from the image signals of the one row and of the previous row obtained at said reading step.

8. A method for operating an image sensing device which performs photoelectric conversion and stores converted charges having a plurality of pixels, arranged in two dimensions, said method comprising:

a first reading step of separately reading image signals stored in a plurality of adjoining rows out of every predetermined number of rows while skipping rows which are not read;

a second reading step of separately reading image signals stored in a plurality of adjoining rows out of the rows skipped at said first reading step, and a storage step of storing the image signals, read at said first and second reading, steps of all the pixels of an entire frame image.

9. The method for operating an image sensing device according to claim 8, wherein said image sensing device includes a plurality of vertical charge transfer means, each provided along each vertical line of said plurality of pixels, for transferring charges in the vertical direction and horizontal charge transfer means for transferring charges in the horizontal direction, and at least eight operation signals are used for operating said vertical charge transfer means.

10. The method for operating an image sensing device according to claim 9, wherein said vertical charge transfer means are operated with eight operation signals to read image signals in two adjoining rows while skipping two rows at said first and second reading steps.

11. An image sensing apparatus comprising:

an image sensing device, having a plurality of pixels arranged in two dimension, for performing photoelectric conversion and storing converted charges; and control means for controlling said image sensing device with operation signals so as to add image signals of a plurality of adjoining rows out of every predetermined number of rows while skipping non-added rows and output the resultant image signals, then add image signals of a plurality of adjoining rows out of the rows skipped previously while skipping non-added rows and output the resultant image signals.

12. The image sensing apparatus according to claim 11, wherein said image sensing device includes a plurality of vertical charge transfer means, each provided along each vertical line of said plurality of pixels, for transferring charges in the vertical direction and horizontal charge transfer means for transferring charges in the horizontal direction, and said vertical charge transfer means is controlled by said control means with at least eight operation signals.

13. The image sensing apparatus according to claim 12, wherein said control means controls the operation signals so as to alternatively repeat 1) a process for adding signals stored in a plurality of adjoining pixels in the vertical direction in a plurality of rows and outputting the resultant signals and 2) a process for adding signals stored in a plurality of adjoining pixels in the oblique direction in a plurality of rows by transferring signals in a row to said horizontal charge transfer means, shifting the signals in the horizontal direction by one pixel, transferring signals in a next row to said horizontal charge transfer means, and repeating the transferring and shifting of signals until the plurality of adjoining pixels are added in said horizontal transfer means, and outputting the resultant signals until one frame is processed.

14. The image sensing apparatus according to claim 13, wherein said control means controls said vertical charge transfer means with eight operation signals to read image signals in two adjoining rows out of every four rows while skipping two rows.

15. The image sensing apparatus according to claim 11, wherein the pixels of said image sensing device are covered with a complementary color filter of magenta, green, cyan, and yellow, arranged in such a manner that different combinations of two colors are used in even rows and odd rows and appear alternatively, and the two colors in either the even rows or odd rows are arranged in a check pattern.

16. The image sensing apparatus according to claim 11, wherein the pixels of said image sensing device are covered with a complementary color filter of magenta, green, cyan, and yellow, arranged in such a manner that different combinations of two colors are used in even rows and odd rows and appear alternatively, and the two colors in the even rows and the two colors in odd rows are arranged in check patterns.

17. An image sensing apparatus comprising:
an image sensing device which performs photoelectric conversion and stores converted charges, having:
  a plurality of pixels arranged in two dimensions and covered with a complementary color filter of magenta, green, cyan and yellow, arranged in such a manner that different combinations of two colors are used in even rows and odd rows and appear alternatively, and the two colors in either the even rows or odd rows are arranged in a check pattern;
  a plurality of vertical charge transfer means, each provided along each vertical line of said plurality of pixels, for transferring charges in the vertical direction, operated with eight operation signals; and
  horizontal charge transfer means for transferring charges in the horizontal direction; and
  control means for controlling said image sensing device with the operation signals for reading image signals 1) by alternatively performing a process of adding signals stored in pairs of adjoining pixels in the vertical direction in two rows while skipping two rows and outputting the resultant signals from said image sensing device and a process of adding signals stored in pairs of adjoining pixels in the oblique direction in two rows by transferring signals in a row to said horizontal charge transfer means, shifting the signals in the horizontal direction by one pixel, transferring signals in a next row to said horizontal charge transfer means, and repeating the transferring and shifting of signals until the plurality of adjoining pixels are added in said horizontal transfer means, while skipping two rows and outputting the resultant signals until one frame is processed in a field period, then alternatively performing a process of adding signals stored in pairs of adjoining pixels in the vertical direction in two rows which are skipped previously while skipping two rows and a process of adding signals stored in pairs of adjoining pixels in the oblique direction in two rows which are skipped previously while skipping two rows in a next field period until one frame is processed, and 2) by performing a process of adding image signals stored in pairs of adjoining pixels in two rows whose combination are changed every field period and outputting the resultant image signals;

luminance signal generation means for generating a luminance signal from the image signals of one row and of a previous row; and color difference signal generation means of generating color difference signals from the image signals of the one row and of the previous row.

18. An image sensing apparatus comprising:
an image sensing device which performs photoelectric conversion and stores converted charges having a plurality of pixels arranged in two dimensions;
control means for controlling said image sensing device with operation signals so as to separately read image signals stored in a plurality of adjoining rows out of every predetermined number of rows then separately read image signals stored in a plurality of adjoining rows out of the rows which were not read previously; and
storage means for storing the read image signals of all the pixels of an entire frame image.

19. The image sensing apparatus according to claim 18, wherein said image sensing device includes a plurality of vertical charge transfer means, each provided along each vertical line of said plurality of pixels, for transferring charges in the vertical direction and horizontal charge transfer means for transferring charges in the horizontal direction, and said vertical charge transfer means is operated by said control means with at least eight operation signals.

20. The image sensing apparatus according to claim 19, wherein said control means controls said vertical charge transfer means with eight operation signals to read image signals in two adjoining rows while skipping two rows.

21. An image sensing apparatus comprising:
an image sensing device which performs photoelectric conversion and stores converted charges having:
  a plurality of pixels arranged in two dimensions and covered with a complementary color filter of magenta, green, cyan, and yellow, arranged in such a manner that different combinations of two colors are used in even rows and odd rows and appear alternatively, and the two colors in the even rows and the two colors in odd rows are arranged in check patterns;
  a plurality of vertical charge transfer means, each provided along each vertical line of said plurality of pixels, for transferring charges in the vertical direction, operated with eight operation signals; and horizontal charge transfer means for transferring charges in the horizontal direction; and control means for controlling said image sensing device with the operation signals for reading image signals by 1) alternatively repeating a process for adding signals stored in pairs of adjoining pixels in the vertical direction in two rows while skipping two rows and outputting the resultant signals from said image sensing device, and a process for adding signals stored in pairs of adjoining pixels in the oblique direction in two rows by transferring signals in a row to said horizontal charge transfer means, shifting the signals in the horizontal direction by one pixel, transferring signals in a next row to said horizontal charge transfer means, and repeating the transferring and shifting of signals until the plurality of adjoining pixels are added in said horizontal transfer means, while skipping two rows and outputting the resultant signals until one frame is processed in a field period, then alternatively repeating a process for adding signals stored in pairs of adjoining pixels in the vertical direction in two rows which are skipped previously while skipping two rows and a process for adding signals stored in pairs of adjoining pixels in the oblique direction in two rows which are skipped previously while skipping two rows in a next field period until one frame is processed, or 2) by performing a process for separately reading image signals stored in adjoining two rows while skipping two rows, then separately reading image signals stored in adjoining two rows skipped previously while skipping two rows;

storage means for storing the read image signals of all the pixels of an entire frame image when the image signals are read in the latter processing controlled by said control means;

luminance signal generation means for generating a luminance signal from the image signals of one row and of a previous row when the image signals are read in the former processing controlled by said control means, and generating a luminance signal from the image signals stored in said storage means when the image signals are read in the latter processing; and color difference signal generation means of generating color difference signals from the image signals of the one row and of the previous row when the image signals are read from said image sensing device in the former processing, and generating a color difference signal from the image signals stored in said storage means when the image signals are read in the latter processing.

* * * * *